(12) United States Patent
Kim et al.

(10) Patent No.: US 11,074,207 B1
(45) Date of Patent: Jul. 27, 2021

(54) SYSTEM-ON-CHIPS AND METHODS OF CONTROLLING RESET OF SYSTEM-ON-CHIPS

(71) Applicant: SAMSUNG ELECTRONICS CO., LTD., Suwon-si (KR)

(72) Inventors: Jiwoong Kim, Yongin-si (KR); Dongjoo Kim, Seoul (KR); Jaekuk Park, Suwon-si (KR); Yujin Oh, Ulsan (KR); Moonki Jang, Hwaseong-si (KR); Jieun Jeong, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/929,260

(22) Filed: Jul. 15, 2020

(30) Foreign Application Priority Data

Jan. 29, 2020 (KR) .................. 10-2020-0010401

(51) Int. Cl.
| | |
|---|---|
| *G06F 11/07* | (2006.01) |
| *G06F 11/14* | (2006.01) |
| *G06F 13/40* | (2006.01) |
| *G06F 13/38* | (2006.01) |
| *B60T 7/12* | (2006.01) |
| *H04L 12/40* | (2006.01) |
| *B60R 16/023* | (2006.01) |

(52) U.S. Cl.
CPC .......... *G06F 13/385* (2013.01); *B60R 16/023* (2013.01); *B60T 7/12* (2013.01); *G06F 11/0757* (2013.01); *G06F 11/1441* (2013.01); *G06F 13/4036* (2013.01); *H04L 12/40* (2013.01); *B60T 2201/03* (2013.01); *G06F 2213/0026* (2013.01); *G06F 2213/0038* (2013.01); *H04L 2012/40215* (2013.01)

(58) Field of Classification Search
CPC ............. G06F 11/1441; G06F 11/0757; G06F 13/4036
See application file for complete search history.

(56) References Cited

U.S. PATENT DOCUMENTS

| | | | |
|---|---|---|---|
| 6,134,655 A | * | 10/2000 | Davis .................. G06F 11/0757 713/1 |
| 6,834,368 B2 | | 12/2004 | Nozuyama |
| 7,454,604 B2 | | 11/2008 | Cheng |
| 9,444,492 B2 | | 9/2016 | Willey et al. |
| 10,228,745 B2 | | 3/2019 | Costa et al. |

(Continued)

*Primary Examiner* — Zachary K Huson
(74) *Attorney, Agent, or Firm* — Sughrue Mion, PLLC

(57) ABSTRACT

A system-on-chip (SoC) includes a processor, a system interconnect (a first bus) connected to the processor, a physical layer protocol (PHY) intellectual property (IP) block, a second bus connected to the processor, and a reset controller connected to the first bus and the second bus. The processor includes a plurality of central processing unit (CPU) cores. The PHY IP block, connected to the first bus, includes a plurality of PHY IPs including physical layers and is connected to external devices. The reset controller detects an abnormal state of the processor based on a signal from the processor, or an absence of a signal from the processor. The reset controller applies a reset signal to the PHY IP block in response to the detected abnormal state. The PHY IP block outputs a corresponding preset data to respective one of the external devices in response to the reset signal during a reset period.

20 Claims, 18 Drawing Sheets

(56) References Cited

U.S. PATENT DOCUMENTS

| | | | |
|---|---|---|---|
| 2006/0107114 A1* | 5/2006 | Michaelis | G06F 11/0721 714/25 |
| 2016/0314057 A1* | 10/2016 | De Oliveira | G06F 11/1484 |
| 2018/0095863 A1 | 4/2018 | Woo | |
| 2019/0108105 A1 | 4/2019 | Han et al. | |
| 2019/0302861 A1 | 10/2019 | Desai et al. | |
| 2019/0318097 A1 | 10/2019 | Katragada et al. | |

* cited by examiner

460

500

SYSTEM-ON-CHIPS AND METHODS OF CONTROLLING RESET OF SYSTEM-ON-CHIPS

CROSS-REFERENCE TO THE RELATED APPLICATION

This application is based on and claims priority under 35 USC § 119 to Korean Patent Application No. 10-2020-0010401, filed on Jan. 29, 2020, in the Korean Intellectual Property Office (KIPO), the disclosure of which is incorporated in its entirety by reference herein.

BACKGROUND

1. Field

Example embodiments relate generally to a system-on-chip (SoC), and more particularly to an SoC capable of providing a preset data to an external device in reset state and a method of controlling reset of the SoC.

2. Descriptions of the Related Art

Application processors (APs) are used in various mobile devices, such as smartphones, tablet computers, notebook computers, navigational devices, and the like. An AP may be implemented as a system-on-chip (SoC), which is a single electronic chip in which a complex electronic system includes various circuits, functional blocks, memory, logic, etc.

An SoC may include one or more processors to control the system and various SoC components including intellectual property (IP) blocks controlled by the one or more processors. The IP blocks may include various circuits, logic, or a combination thereof. The circuits and logic may include or be associated with code or at least one instruction. The IP blocks may include a master IP block and a slave IP block. IP blocks are connected together through transaction interfaces that enable data transfer. A time in which a transaction is pending may be a time between an SoC component that sends a request, e.g., the master IP block sending a request, and another SoC component that sends a response, e.g., the slave IP block sending a response.

During the course of operation, an SoC may fall into abnormal state such as a deadlock state. For example, during a solution development process, a deadlock within an SoC may occur due to various reasons. The deadlock may include an inoperable state in which SoC components, other components in the SoC, within an SoC send a request and are unable to receive a response.

During abnormal state, external devices connected to SoC may operate abnormally.

SUMMARY

Some example embodiments are directed to provide an SoC capable of outputting preset data to external devices in abnormal state.

Some example embodiments are directed to provide a method of controlling reset in an n SoC, capable of outputting preset data to external devices in abnormal state Provided herein is a system-on-chip (SoC), including a processor including a plurality of central processing unit (CPU) cores; a first bus connected to the processor, the first bus being configured as a system interconnect; a physical layer protocol (PHY) intellectual property (IP) block connected to the first bus, wherein the PHY IP block includes a plurality of PHY IPs, and the plurality of PHY IPs being configured to connect to external devices; a second bus connected to the processor; and a reset controller connected to the first bus and to the second bus, wherein the reset controller is configured to: receive a first signal from the processor, detect an abnormal state of the processor based on an absence of the first signal from the processor, and apply a reset signal to the PHY IP block responsive to the detected abnormal state, and wherein the PHY IP block is configured to output, during a reset period, preset data values to respective ones of the external devices in response to the reset signal.

Also provided herein is a method of controlling a reset of a system-on-chip (SoC), wherein the SoC includes a processor including a plurality of central processing unit (CPU) cores, a system interconnect connected to the processor, a physical layer protocol (PHY) intellectual property (IP) block connected to the first bus, and including a plurality of PHY IPs including physical layers and connected to external devices, a reset controller connected to the system interconnect, the method including: receiving a first signal from the processor; detecting, at the reset controller, an abnormal state of the processor based on absence of the first signal from the processor; applying, by the reset controller, a reset signal to the PHY IP block in response to the detected abnormal state; outputting, by each of the plurality of PHY IPs during a reset period, preset data values to respective ones of the external devices in response to the reset signal; and resetting the processor and the reset controller.

Also provided herein is a A system-on-chip (SoC), including: a processor including a plurality of central processing unit (CPU) cores; a first bus connected to the processor, the first bus being configured as a system interconnect; a physical layer protocol (PHY) intellectual property (IP) block connected to the first bus, wherein the PHY IP block includes a plurality of PHY, and the plurality of PHY IPs being configured to connect to external devices; a second bus connected to the processor; and a reset controller connected to the first bus and to the second bus, wherein the reset controller is configured to: detect an abnormal state of the processor based on an absence of a first signal from the processor, and apply a reset signal to the PHY IP block responsive to the detected abnormal state, wherein the PHY IP block is configured to output, during a reset period, preset data values to respective ones of the external devices in response to the reset signal, and wherein the reset controller includes a watchdog timer configured to detect the abnormal state in response to an expiration of the watchdog timer, wherein the expiration is configured to occur responsive to an abnormal operation of the processor.

Accordingly, in an abnormal state of the SoC, each of the PHY IPs connected to external devices through a physical layer may output a corresponding preset data to respective one of the external devices via a corresponding output pin and the SoC may guarantee a normal operation of the external devices in the abnormal state.

BRIEF DESCRIPTION OF THE DRAWINGS

Illustrative, non-limiting example embodiments will be more clearly understood from the following detailed description in conjunction with the accompanying drawings.

DETAILED DESCRIPTION

Various example embodiments will be described more fully hereinafter with reference to the accompanying drawings, in which some example embodiments are shown.

Figure 1:
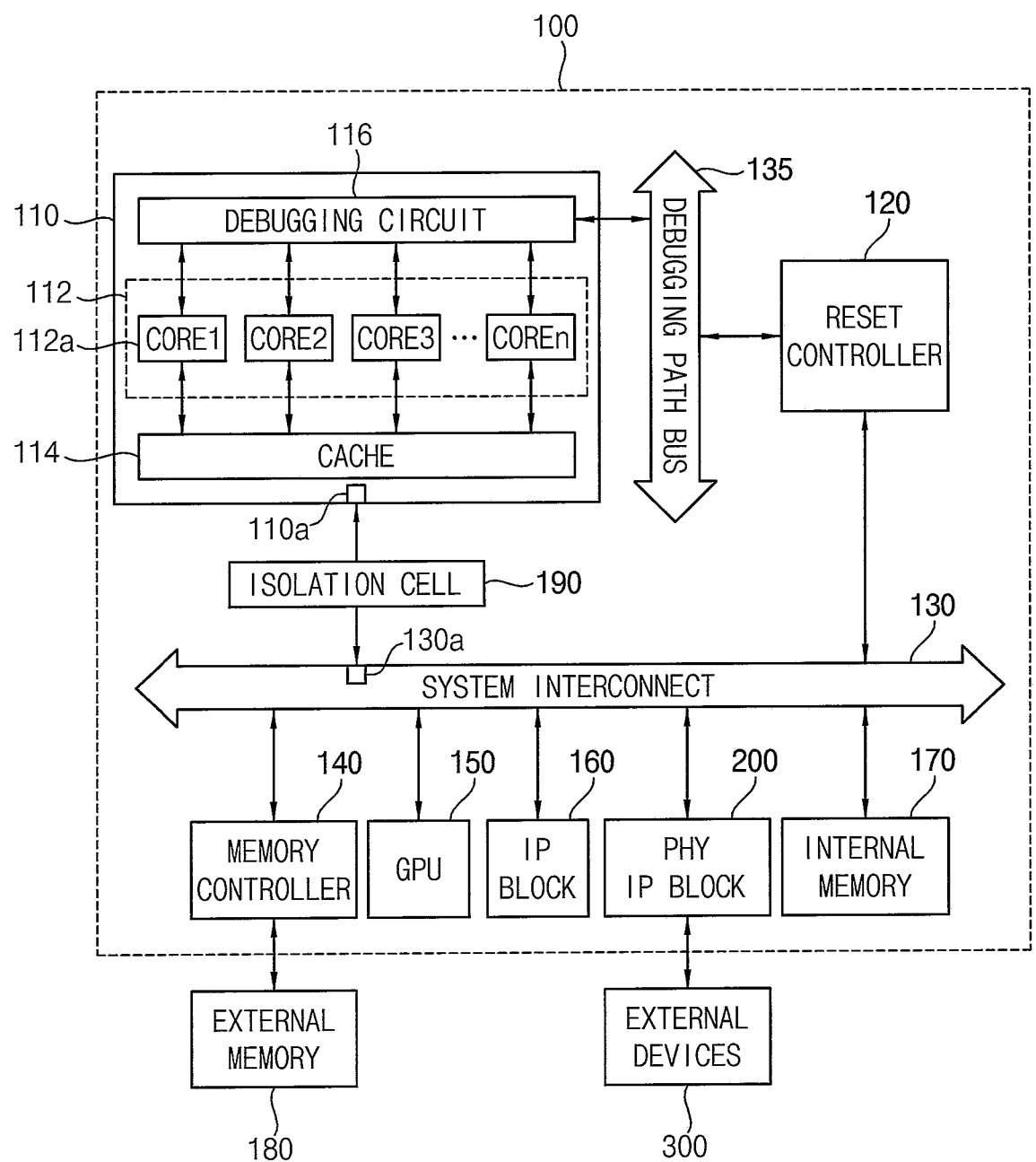
FIG. 1 is a block diagram illustrating a System-on-Chip (SoC) according to some example embodiments.

FIG. 1 is a block diagram illustrating a System-on-Chip (SoC) according to some example embodiments.

Referring to FIG. 1, an SoC 100 may include a processor 110, buses 130 and 135, a reset controller 120, a memory controller 140, a Graphic Processing Unit (GPU) 150, an intellectual property (IP) block 160, a physical layer protocol (PHY) IP block 200 and an internal memory 170.

The internal memory 170 may be a system memory included in the SoC 100, e.g., a memory connected to the processor 110 through a first bus (a system interconnect bus) 130. The IP block 160 may include one or more IPs, such a master IP and a slave IP. In some embodiments, an IP block is a reusable portion of logic which is the intellectual property of one party and may be licensed to another party.

The processor 110 may include one or more central processing units (CPUs) that process code, instructions, programs, and/or data retrieved from various memories, such as the internal memory 170 and an external memory 180.

The external memory 180 may be a memory connected to the SoC 100 through a connection interface, e.g., the memory controller 140 and the first bus 130. The SoC 100 may include various SOC components including the IP block 160 configured to process designated operations and functions, such as one or more application-specific instruction set processors (ASIPs). The processor 110 may control the system of the SoC 100.

The processor 110 may include one or more clusters 112, and each of the one or more clusters 112 may include a plurality of CPU cores including a first CPU core 112a.

The CPU cores may process instructions of a computer program, a software application, and the like. For example, the CPU cores may fetch instructions and/or data, process the fetched instructions and/or data, and store the data in a register of the CPU cores. It is also contemplated that the computer program and/or the software application may be software programs developed under a user development environment.

As illustrated in FIG. 1, the processor 110 includes one cluster 112 including four CPU cores, but example embodiments are not limited thereto. For example, the processor 110 may include multiple clusters.

The multiple clusters may include heterogeneous clusters, e.g., a first-type cluster and a second-type cluster. The first-type cluster may be a little cluster and the second-type cluster may be a big cluster, which have relatively high performance CPU cores in comparison with the little cluster. The processing speeds of the cores in the first-type cluster may be slower than the processing speeds of the cores in the second-type cluster.

The processor 110 may further include a cache memory 114 and a debugging circuit 116. According to some example embodiments, a plurality of clusters may be connected to a single cache memory. The cache memory 114 may temporarily store data that is frequently used, thereby reducing access time to read data from the external memory 180 or the internal memory 170. The cache memory 114 may enhance the processing power of the processor 110 because the CPU cores may access the cache memory 114 more quickly than the internal memory 170 and the external memory 180. For example, the cache memory 114 may include L2 cache.

The debugging circuit 116 may provide access to the CPU cores for a debugging process based on a debugging control signal. Further, the debugging circuit 116 may obtain state information of the CPU cores of the one or more clusters 112. The debugging circuit 116 may access each of the CPU cores to retrieve values in registers of the CPU cores.

The processor 110 may sequentially read instructions stored in the internal memory 170 or the external memory 180 and perform computing operations according to the instructions per computing cycle. The processor 110 may control other SoC components in SoC 100 based on the computation results. Further, SoC components connected through the first bus 130, such as the memory controller 140, the GPU 150, the IP block 160, the PHY IP block 200 and the internal memory 170, may be controlled by the processor 110.

The reset controller 120 may be connected to the processor 110 through the second bus 135. The reset controller 120 may retrieve the values of registers of the CPU cores through the debugging circuit 116. For instance, the reset controller 120 may retrieve the values of registers of the CPU cores via the second bus 135.

The various components of the SoC 100 may be connected to the first bus 130 via one or more connection interfaces, such as one or more port interfaces. To this end, the one or more connection interfaces (e.g., connection interface 110a, 130a) may be configurable to, for instance, isolate various components from the first bus 130.

For example, the processor 110 may be isolated from the first bus 130 in response to the a signal transferred via the first bus 130.

Although illustrated as part of first bus 130, the "configurable aspects" of the connection interface 130a may reside in the processor 110, may be a component of a bus controller (not shown) or bus arbiter configured to grant component access to the first bus 130, or may be provided as a combination thereof. It is also noted that the one or more clusters 112 of the processor 110 may assign transactions to one or more of the IP blocks 160 via the first bus 130.

The second bus 135 may be a debugging path bus. As such, the second bus 135 may be, hereinafter, referred to as debugging path bus 135. The debugging path bus 135 may be a bus used for a debugging process. In this manner, the debugging path bus 135 may operate in a debugging mode. For example, the debugging circuit 116 of the processor 110 may communicate with the deadlock controller 120 through the second bus 135. It is noted that the second bus 135 may be independent of the first bus 130. That is, the second bus 135 may not be a component of the first bus 130.

The memory controller 140 may provide an interface between the external memory 180 and other internal SoC components including the processor 110. The memory controller 140 may control the external memory 180. The memory controller 140 may control data exchange between the processor 110 and the external memory 180. For example, the memory controller 140, in response to a request of a host, e.g., the processor 110, may write data in an address of the external memory 180 or read data from the external memory 180. The host may be a processor that operates an operating system (OS), and the processor 110 may serve as a host. The host may include master IPs, such as a GPU 150 and a display controller, in addition to the processor 110. One or more example embodiments illustrate that processor state information of the processor 110 in an abnormal state is retrieved through the second bus 135. However, such a configuration to retrieve processor state information may be applicable with respect to other types of processors, such as the GPU 150.

The external memory 180 may be a storage medium to store various data, such as an operating system (OS), programs, applications, and/or other types of data. The external memory 180 may be a DRAM, but example embodiments are not limited thereto. For example, the external memory 180 may include volatile memories and/or non-volatile memories, e.g., at least one of a flash memory, a phase change RAM (PRAM), a magnetic RAM (MRAM), a resistive RAM (RRAM), and ferroelectric RAM (FeRAM), or even a hard disk drive or any other suitable information repository.

The IP block 160 may be an SoC component configured to perform various functions and operations in the SoC 100, and may be classified into master IPs and slave IPs as described above. It is also contemplated that the master IPs may serve as slave IPs, or vice versa.

The PHY IP block 200 may be an IP block among IP blocks, connected to the external devices via a physical layer. The PHY IP block 200 may output a preset data to the external devices 300 in a reset period of the abnormal state of the processor 110.

The internal memory 170 may include a read-only memory (ROM) and/or a random access memory (RAM). A ROM may store permanent data and/or a program, and may include erasable programmable ROM (EPROM), electrically erasable programmable ROM (EEPROM), and the like. A RAM may be a temporary storage device when power is supplied. For example, a RAM may temporarily store programs, data, and instructions, etc. Examples may include dynamic RAM (DRAM), static RAM (SRAM), etc.

As previously mentioned, the one or more clusters 112 of the processor 110 may assign a transaction to the IP block 160 and/or the PHY IP block 200 via the first bus 130. When a software program is running, an abnormal state may occur in the SoC 100. The abnormal state may include at least one of a deadlock state and a hang-up state.

The processor deadlock may occur in the process of assigning a transaction generated by the one or more clusters 112 of the processor 110. For instance, the components in the SoC may include at least one of the first bus 130, the memory controller 140, the IP block 160, the PHY IP block 200 and the internal memory 170.

When a deadlock state occurs in the SoC 100 as described above, the processor 110 and various other SoC components may fall into a deadlock state, and, thereby, become inoperable. With the processor 110, the first bus 130, and potentially other components of the SoC in a deadlock state, it may be difficult to ascertain the cause of the deadlock state. To resolve the deadlock state, the SoC 100 may be reset. In addition, when a deadlock state occurs in the SoC 100, desired data is not output to the external devices 300 or wrong data is output to the external devices 300. It is noted, however, that if the SoC 100 is reset, state information of the processor 110 will also be reset (or otherwise changed or modified). For example, the values of registers in the CPU cores at the time of the deadlock state may be lost.

The hang-up state may denote a state in which the cluster 112 in the processor 110 stops program execution without any reason, or unexpectedly, or the cluster 112 in the processor 110 does not execute a program any more when the cluster 112 enters a permanent loop during program execution. When the hang-up state occurs in the processor 110, the processor 110 is not capable of providing an initializing signal to the reset controller 120.

According to some example embodiments, the SoC 100 includes the reset controller 120 that detects an abnormal state of the SoC 100 and controls the PHY IP block 200 to output a preset data to the external devices 300 during a reset period responding to the abnormal state. In addition, the reset controller 120 may detect the abnormal state of the SoC 100 and may extract state information of at least one CPU core 112a before system reset.

Figure 2:
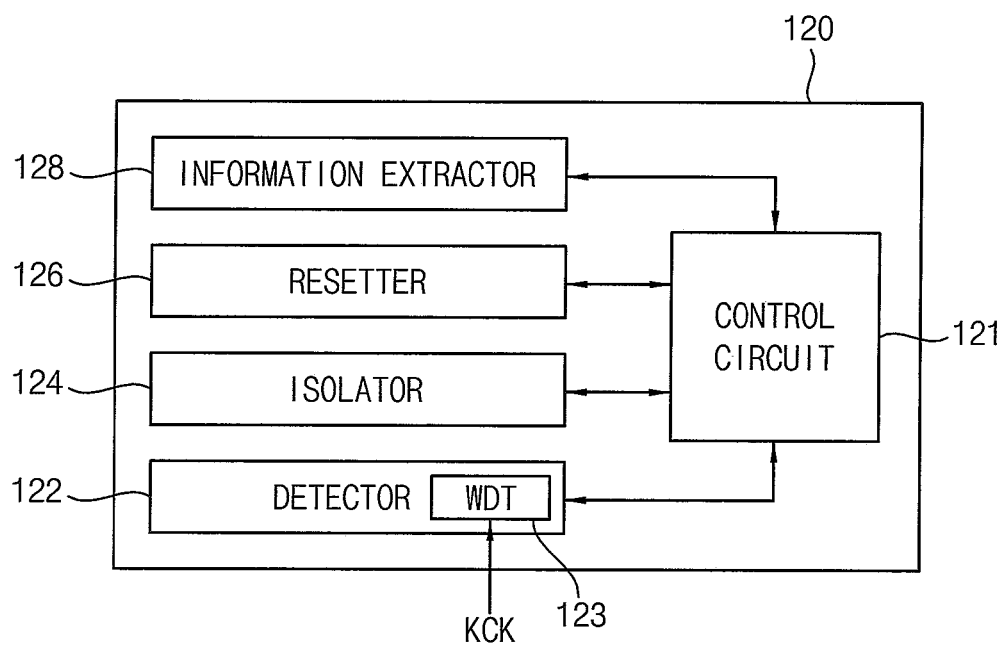
FIG. 2 is a block diagram illustrating an example of the reset controller in FIG. 1 according to some example embodiments.
Figure 3:
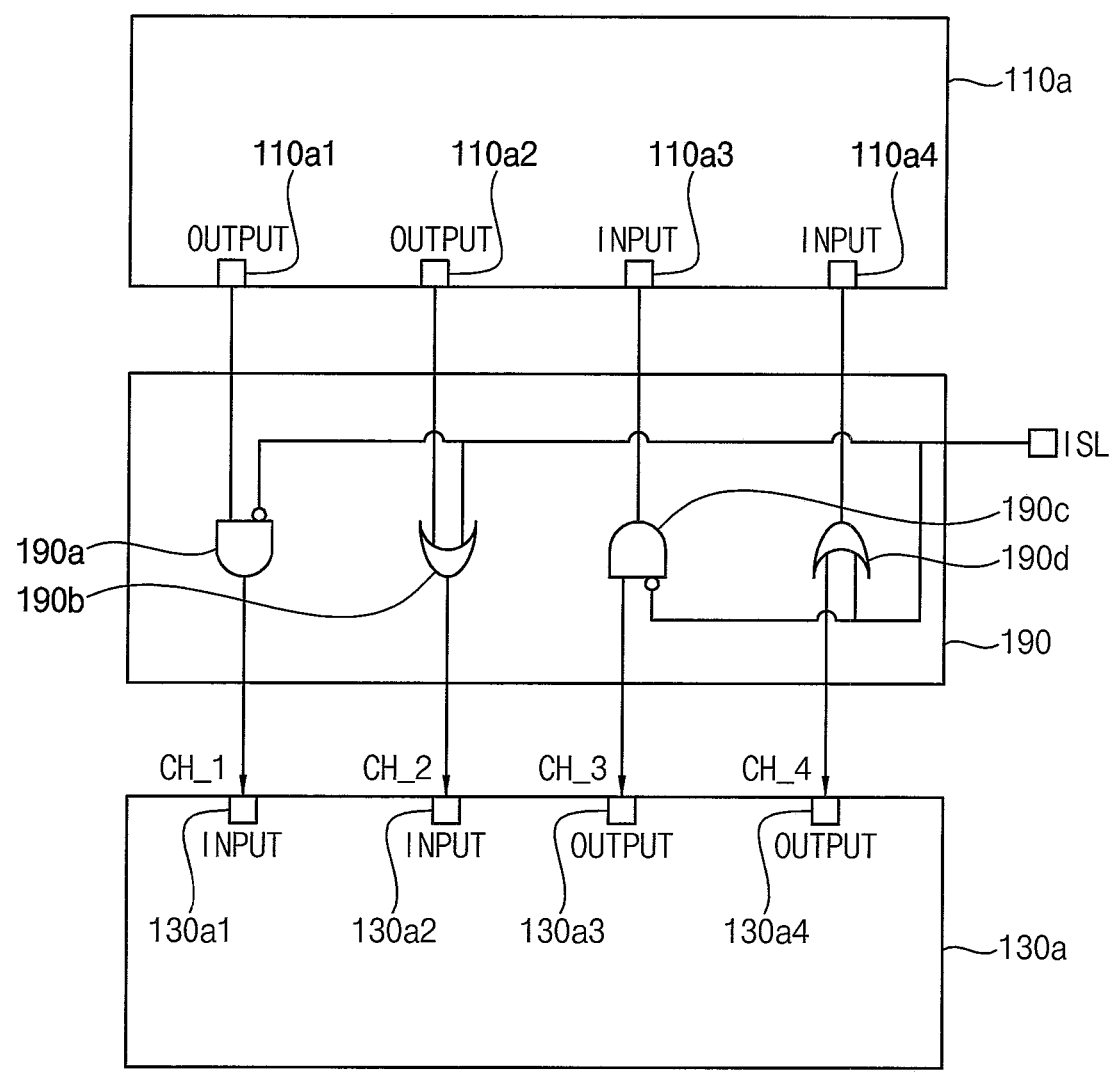
FIG. 3 is a block diagram illustrating the isolation cell in FIG. 1 according to some example embodiments.

FIG. 2 is a block diagram illustrating an example of the reset controller in FIG. 1 according to some example embodiments and FIG. 3 is a block diagram illustrating the isolation cell in FIG. 1 according to some example embodiments.

Referring to FIG. 2, the reset controller 120 may include a control circuit 121, a detector 122, an isolator 124, a resetter 126, and an information extractor 128.

One or more of the control circuit 121, the detector 122, the isolator 124, the resetter 126, and the information extractor 128 may be block units configured to perform the operations described herein, and may be implemented as a finite state machine (FSM) or a processor. In other words, the control circuit 121 may be configured to store states of one or more components of the SoC 100, such as one or more states of the processor 110. The states of the components may change in response to triggering conditions, such as a deadlock condition of the processor 110. Given that the deadlock controller 120 is a component of the SoC 100, the control circuit 121, the detector 122, the isolator 124, the resetter 126, and the information extractor 128 may be implemented in a processor or an FSM as noted above.

According to some example embodiments, the FSM may include a program and a sequential logic circuit to enable the FSM to perform operations of the control circuit 121, the detector 122, the isolator 124, the resetter 126, and the information extractor 128.

If the FSM is implemented as sequential logic circuits, each block unit, e.g., the control circuit 121, the detector 122, the isolator 124, the resetter 126, and the information extractor 128, may be configured as a separate logic circuit to perform the corresponding operation. Further, a logic circuit may be configured to perform two or more operations of the block units. For example, the detector 122 and the resetter 126 may be implemented as a logic circuit, and the isolator 124 and the information extractor 128 may be implemented as separate logic circuits. A logic circuit may be a hardware circuit. One or more block units, e.g., the isolator 124 and the information extractor 128, may be implemented as software programs.

The control circuit 121 may control the operations of the detector 122, the isolator 124, the resetter 126, and the information extractor 128. As noted above, the control circuit 121 may be implemented as an FSM. Further, the reset controller 120 may be implemented as a processor, and, in this manner, may be referred to as a "reset control processor." To this end, the detector 122, the isolator 124, the resetter 126, and the information extractor 128 may correspond to the respective operations of the reset control processor.

The detector 122 may detect an abnormal state of the SoC 100. For instance, the detector 122 may include a watchdog timer 123.

The watchdog timer 123 may initialize counting in response to an initialization signal (a kick signal KCK). The kick signal KCK may be provided periodically, such as provided periodically from processor 110. If the detector 122 fails to receive the kick signal KCK before the expiration of the watchdog timer 123 in the detector 122, the watchdog timer 123 will expire and operation of the watchdog timer 123 may stop. If the watchdog timer 123 expires, a signal indicating expiration of the watchdog timer 123 may be sent to the control circuit 121. The signal indicating the expiration of the watchdog timer 123 may be a signal for detecting an abnormal state of the SoC 100.

For instance, the SoC 100 may be in a deadlock state while running a software program. In this manner, components of the SoC 100 including the processor 110 may transition into a wait state (or completely stop operation) and, thereby, become non-responsive. In this manner, the SoC component that provides the kick signal KCK to the watchdog timer 123 may become inoperable in the deadlock state, and, as such, will fail to provide the kick signal KCK to the detector 122. As such, the signal indicating expiration of the time may serve as a signal for detecting the deadlock state of the SoC 100, such as a deadlock state of the processor 110.

The isolator 124 may isolate the processor 110 from the first bus 130 in response to a detection of the abnormal state including a deadlock state of the processor 110. For instance, the isolator 124 may isolate an interface signal of the processor 110 in the deadlock state.

In an example, the isolator 124 may include a clamping configuration, e.g., a wiring, to isolate the processor 110 from the first bus 130. By using a clamping operation or other signal retention scheme, an interface signal on the first bus 130 may be fixed, such that a reset signal on the first bus 130 does not affect the interface signal of the processor 110 and the values of registers of CPU cores 112a may remain the same.

Referring to FIG. 3, the isolation cell 190 may be implemented between channels connecting a connection interface 110a of the processor 110 and a connection interface 130a of the first bus 130.

For an illustrative example, four channels CH_1, CH_2, CH_3, and CH__4 are implemented by the connection interface 110a of the processor 110 and the connection interface 130a of the first bus 130, respectively.

The isolation cell 190 forwards a signal from the first channel CH_1 of the processor 110 to the first channel CH_1 of the first bus 130 when a first logic gate 190a of the isolation cell 190 does not receive an isolation signal ISL having an enabled value '1'. The isolation cell 190 forwards a signal from the second channel CH_2 of the processor 110 to the second channel CH_2 of the first bus 130 when a second logic gate 190b of the isolation cell 130 does not receive the isolation signal ISL having an enabled value '1'. The isolation cell 190 forwards a signal from the third channel CH_3 of the first bus 130 to the third channel CH_3 of the processor 110 when a third logic gate 190c of the isolation cell 130 does not receive the isolation signal ISL having an enabled value '1'. The isolation cell 190 forwards a signal from the fourth channel CH_4 of the first bus 130 to the fourth channel CH_4 of the processor 110 when a fourth logic gate 190d of the isolation cell 130 does not receive the isolation signal ISL having an enabled value '1'.

The four channels CH_1, CH_2, CH_3, and CH_4 interconnecting the processor 110 and the first bus 130 according to an isolation signal may be implemented by configuring four pads 110a1, 110a2, 110a3, and 110a4 in the connection interface 110a of the processor 110, and four pads 130a, 130a2, 130a3, and 130a4 in the connection interface 130a of the first bus 130.

The isolation cell 190 may include logic circuits, e.g., the logic gates 190a, 190b, 190c, and 190d. The logic gates 190a and 190c may be an AND gate including an inverter to invert the received isolation signal ISL, and the logic gates 190b and 190d may be an OR gate. However, example embodiments are not limited thereto and various other logic gates, such as a NAND gate, NOR gate, an exclusive OR (XOR) gate, exclusive NOR (ENOR) gate, a NOT gate, and a combination thereof such that the isolation cell 190 performs a signal isolation operation according to the isolation signal ISL.

According to one or more example embodiments, only signals output from the first bus 130 to the processor 110 may be isolated. More specifically, both the first channel CH_1 and the second channel CH_2 may not have isolation configurations. When the reset of the first bus and SOC components other than the processor 110 is intended to secure the state information of the processor 110, only the second direction channels CH_3 and CH_4 may be isolated by providing the isolation signal ISL.

Referring to FIGS. 1 and 2, isolation of the processor 110 via isolator 124 enables other SoC components (including e.g., the first bus 130 and the IP block 160) to be reset without resetting the processor 110. In this manner, the states of the processor 110 may be preserved even though the first bus 130 is reset.

As previously mentioned, when the processor 110 is not isolated from the first bus 130, resetting the first bus 130 causes the state information of the processor 110 to be altered. As such, without the isolation, the clusters 112 and the interface signal of the processor 110 are floated by resetting other SoC components, and operations of the reset may not stabilize the SoC components. For example, if the first bus 130 is reset without resetting the processor 110, the state of the processor 110 may be changed when the first bus 130 is reset or after the reset of the first bus 130.

To maintain the state of the processor 110, the isolator 124 may isolate the processor 110 from the first bus 130. The isolator 124 may maintain or fix the interface signal on the processor 110 to keep the transaction status from changing by the reset. For example, the state of the interface signal on the processor 110 is maintained as that in the deadlock state, and the state of the processor 110 does not change by a reset sequence (or signal) on the first bus 130 because the interface signal on the processor 110 remains the same. Clamping or signal retention schemes used in power control, for example, may implement this isolation process as illustrated in FIG. 3.

If another internal memory (not shown) is connected to the reset controller 120, the reset controller 120 may extract the state information of at least one of the CPU cores, e.g., the CPU core 112*a*, in an abnormal state without resetting the first bus 130 and other SoC components, such as the IP block 160.

The resetter 126 may reset SoC components (other than the processor 110) after the isolation process between the processor 110 and the first bus 130. The resetter 126 may be implemented in association with the operation of the detector 122. The resetter 126 may be configured to reset the all of the components of the SoC 100 (including the processor 110) if the watchdog counter 123 of the detector 122 expires.

The information extractor 128 may extract state information of at least one of the CPU cores 112*a* in the one or more clusters 112 of the processor 110 through the debugging circuit 116 and the second bus 135, which is a debugging path bus. The state information may be extracted after the SoC components are reset without resetting the processor 110. If some CPU cores 112*a* are in a deadlock state while other CPU cores are in a different state than the deadlock state (e.g., not in the deadlock state), the information extractor 128 may extract state information of the CPU cores in the deadlock state.

The state information of the CPU cores in the deadlock state may provide information to facilitate analyzing the cause(s) of the deadlock state. In this manner, the state information of the CPU cores in the deadlock state may be used in determining the cause(s) of the deadlock state, reconstructing the state of the deadlock, and/or resolving a problem of the deadlock state.

The extracted state information of the CPU cores in the deadlock state may include information stored in registers of the CPU cores in the deadlock state.

The registers may include general purpose registers (GPRs), special-purpose registers (SPRs), floating-point registers (FPRs), etc. The SPRs may include program counter (PC), stack pointer (SP), a status register, information, etc. The GPRs may store data and addresses. For example, values associated with arithmetic operations and calculations may be stored in the GPRs. The PC may store the memory address of the next instruction that would have been executed if not for the deadlock state. The SP may store the address of the last program request in a stack, which is a specialized buffer that stores data from the top down.

Figure 4:
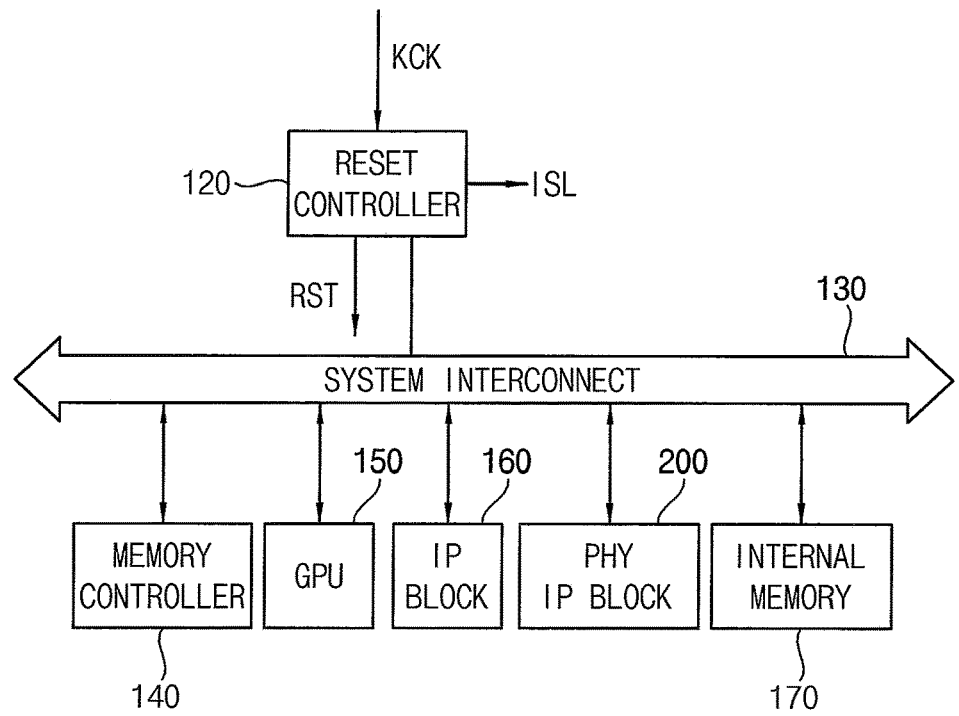
FIG. 4 illustrates connection relationship between the reset controller and other SoC components in the SoC in FIG. 1.

FIG. 4 illustrates connection relationship between the reset controller and other SoC components in the SoC in FIG. 1.

Referring to FIG. 4, a counter in the watchdog timer 123 in the reset controller 120 is initialized in response to the kick signal KCK periodically received from the processor 100. If reset controller 120 does not receive the kick signal KCK from the processor 110 during a reference time interval, the reset controller 120 may provide a reset signal RST indicating that an abnormal state occurs in the processor 110 to the memory controller 140, the GPU 150, the IP block 160, the PHY IP block 200 and the internal memory 170 via the first bus 130 and may provide the isolation signal ISL to the isolation cell 150.

Figure 5A:
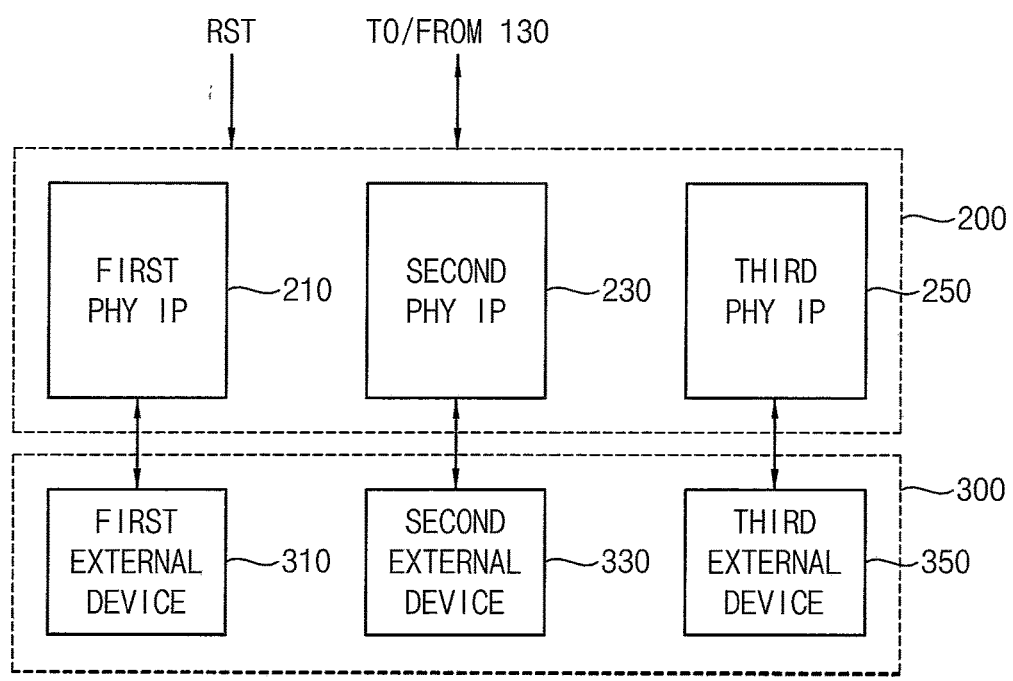
FIG. 5A is a block diagram illustrating the PHY IP block and the external devices in the SoC in FIG. 1 according to some example embodiments.

FIG. 5A is a block diagram illustrating the PHY IP block and the external devices in the SoC in FIG. 1 according to some example embodiments.

Referring to FIG. 5A, the PHY IP block 200 may include at least a first PHY IP 210, a second PHY IP 230 and a third PHY IP 250 and the external devices 300 may include at least a first external device 310 connected to the first PHY IP 210, a second external device 330 connected to the second PHY IP 230 and a third external device 350 connected to the third PHY IP 250.

Each of the first PHY IP 210, the second PHY IP 230 and the third PHY IP 250 may output a respective preset data to respective one of the first external device 310, the second external device 330 and the third external device 350 in a reset period in response to the reset signal RST.

Figure 5B:
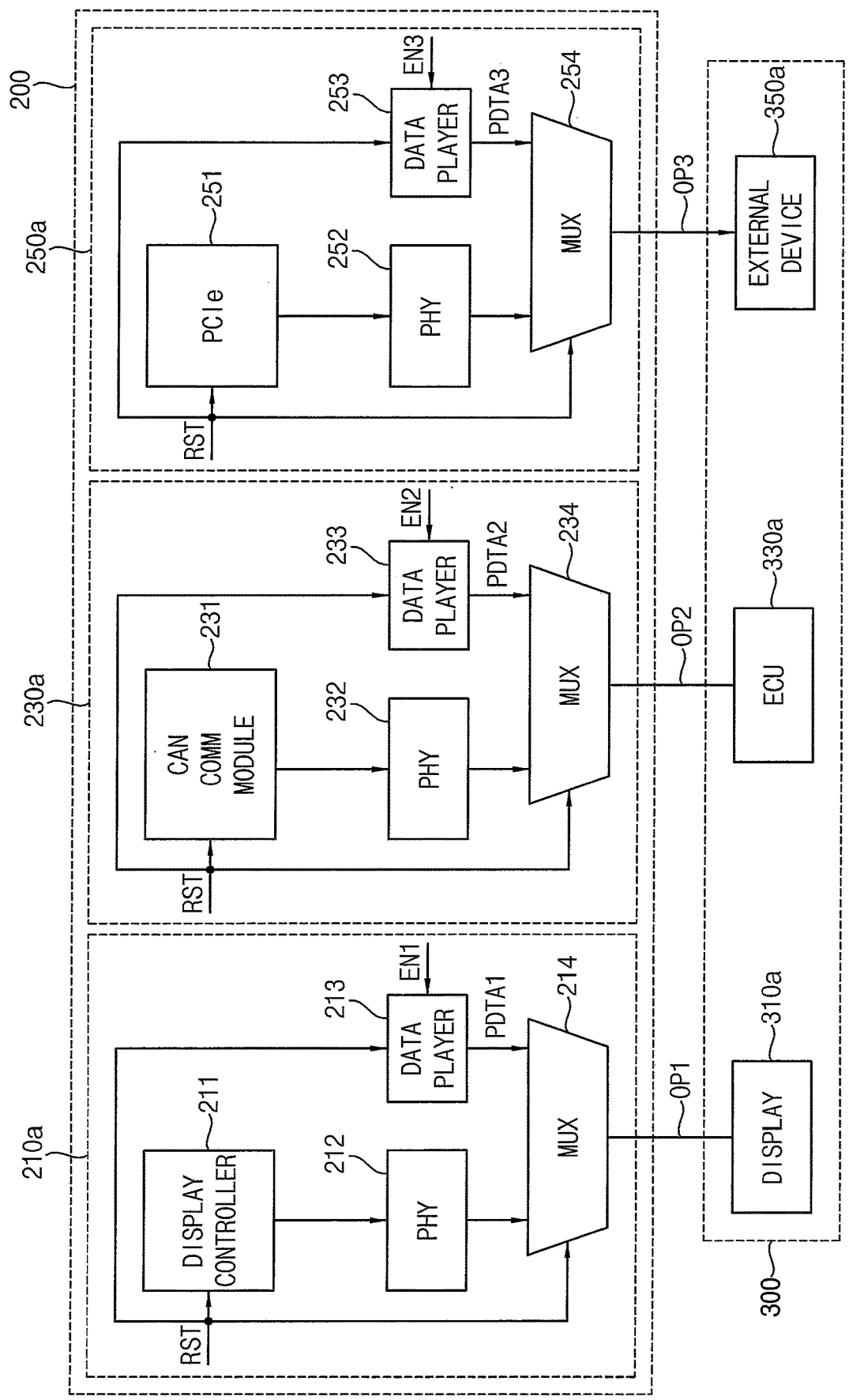
FIG. 5B illustrates the PHY IP block and the external devices in FIG. 5A in detail.

FIG. 5B illustrates the PHY IP block and the external devices in FIG. 5A in detail.

Referring to FIGS. 5A and 5B, the first PHY IP 210 correspond to a display IP 210*a* and the display IP 210*a* may include a display controller 211, a physical layer (PHY) 212, a data player 213 and a multiplexer 214.

The first external device 310 may corresponds to a display device 310*a*. The display controller 211 is reset in response to the reset signal RST, and the data player 213 outputs a first preset data PDTA1 stored therein to the multiplexer 214 in response to the reset signal RST and an enable signal EN1. The display IP 210*a* may generate the enable signal EN1 internally in response to the reset signal RST.

The multiplexer 214 outputs one of an output of the display controller 211 through the physical layer 212 and the first preset data PDTA1 to the display device 310*a* via an output pin OP1 in response to the reset signal RST.

The display IP 210*a* may output an output of the display controller 211 in a normal state and may output the first preset data PDTA1 in the reset state. In example embodiments, the first preset data PDTA1 may correspond to blue screen data. That is, the display device 310*a* may display blue screen in the reset data. The first preset data PDTA1 may be programmed in the data player 213 after the SoC 100 is booted.

The second PHY IP 210 may correspond to a controller area network (CAN) communication IP 230*a* and the CAN communication IP 230*a* may include a CAN communication module 231, a physical layer 232, a data player 233 and a multiplexer 234.

The second external device 330 may correspond to an electronic control unit (ECU) 330*a* in a car. The CAN communication module 231 is reset in response to the reset signal RST, and the data player 233 outputs a second preset data PDTA2 stored therein to the multiplexer 234 in response to the reset signal RST and an enable signal EN2. The CAN communication IP 230*a* may generate the enable signal EN2 internally in response to the reset signal RST.

The multiplexer 234 outputs one of an output of the CAN communication module 231 through the physical layer 232 and the second preset data PDTA2 to the ECU 330*a* via an output pin OP2 in response to the reset signal RST.

The CAN communication IP 230*a* may output an output of the CAN communication module 231 in a normal state and may output the second preset data PDTA2 in the reset state. In example embodiments, the second preset data PDTA2 may correspond to brake control command. The second preset data PDTA2 may be programmed in the data player 233 after the SoC 100 is booted.

The third PHY IP 250 may correspond to a peripheral component interconnect express (PCIe) IP 250a and the PCIe IP 250a may include a PCIe 251, a physical layer 252, a data player 253 and a multiplexer 254. The third external device 350 may correspond to an external device 350a operably connected to the PCIe.

The PCIe 251 is reset in response to the reset signal RST, and the data player 253 outputs a third preset data PDTA3 stored therein to the multiplexer 254 in response to the reset signal RST and an enable signal EN3. The PCIe IP 250a may generate the enable signal EN3 internally in response to the reset signal RST.

The multiplexer 254 outputs one of an output of the PCIe 251 through the physical layer 252 and the third preset data PDTA3 to the external device 350a via an output pin OP3 in response to the reset signal RST. The PCIe IP 250a may output an output of the PCIe 251 in a normal state and may output the third preset data PDTA3 in the reset state. The third preset data PDTA3 may be programmed in the data player 253 after the SoC 100 is booted.

Figure 6:
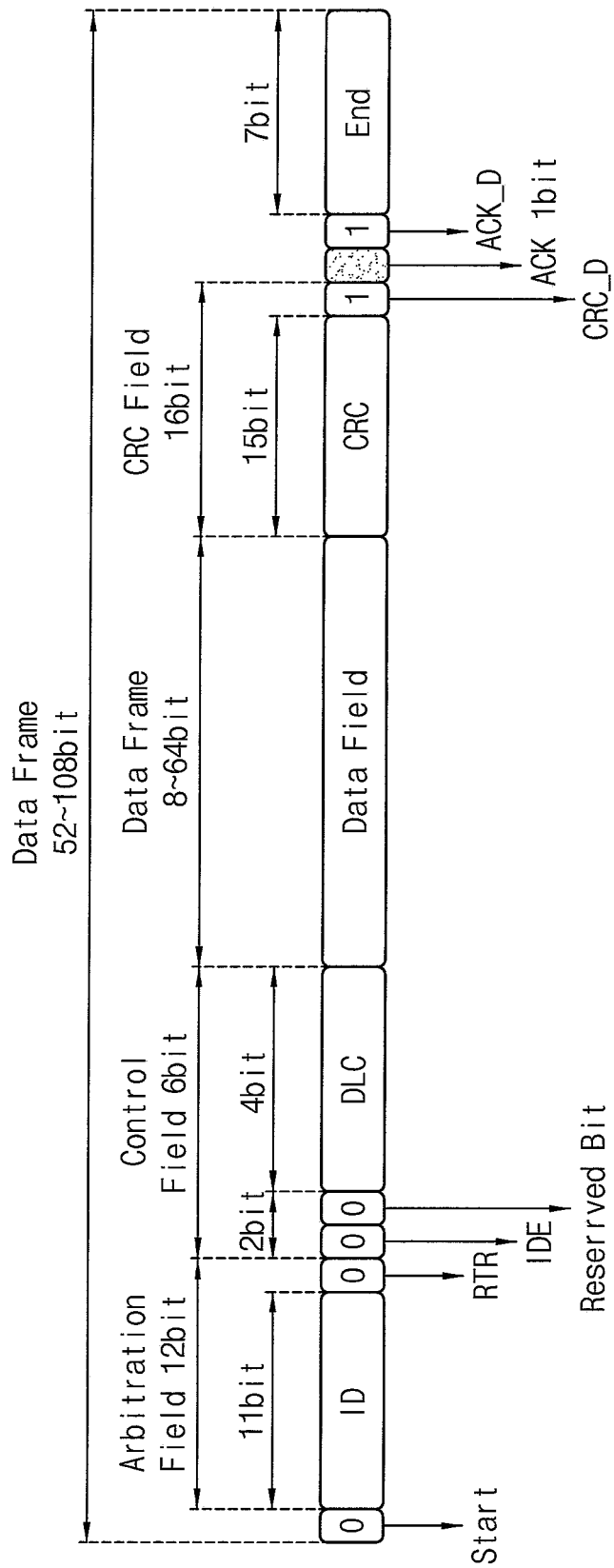
FIG. 6 illustrates structure of a data frame used in the CAN in FIG. 5B.

FIG. 6 illustrates structure of a data frame used in the CAN in FIG. 5B.

Referring to FIG. 6, a data frame for the CAN 2.0 A protocol is divided into a start of frame (Start), an arbitration field, a control field, a data field, a CRC field, an acknowledgment field, and an end of frame (End). The data frame may have a length of 52 bits or more and 108 bits or less.

The arbitration field may include 11-bit identification data ID and 1-bit RTR bit. The identification data ID may indicate the attribute of the data frame. The priority of the data frame may be determined based on the identification data ID. The RTR bit is used to determine the data frame and the remote frame, and may have a bit value of 0 in the data frame.

The control field may include a 1-bit IDE bit, a 1-bit reserved bit, and a 4-bit DLC bit. The IDE bit may be used to indicate a CAN 2.0 A protocol with 11-bit identification data ID, and may have a bit value of 0. The DLC bit may be used to indicate the length of the data field. In the CAN 2.0 protocol, the data field may have a length of 8 bits or more and 64 bits or less. Also, as described above, in the CAN 2.0 A protocol, the data field may be transmitted at a maximum of 1 Mbps.

The CRC field may include a 15-bit CRC bit and a 1-bit CRC delimiter bit. The CRC bits may be used to detect errors through CRC. The CRC delimiter bit may be provided to distinguish the CRC field from the acknowledgment field and may have a bit value of 1. The acknowledgment field may include a 1-bit acknowledgment bit and a 1-bit acknowledgment delimiter bit. The acknowledgment bit may be set to have a bit value of 1 in the transmission information and may be provided to the CAN bus 140. The acknowledgment bit may be set to have a bit value of 0 if reception information is received without error. The acknowledgment delimiter bit may be provided to distinguish the acknowledgment field from the end of frame, and may have a bit value of 1.

When the abnormal state occurs in FIG. 5B, the CAN communication module 213 may notify the ECU 330a of the abnormal state by transmitting the end of frame to the ECU 330a, and the data player 253 may output the second preset data PDTA2 during intervals corresponding to the arbitration field, the control field, the data field, the CRC field, the acknowledgment field and the end of frame.

FIGS. 7 to 12 are block diagrams of a sequential operational flow of an SoC operation according to some example embodiments.

Figure 13:
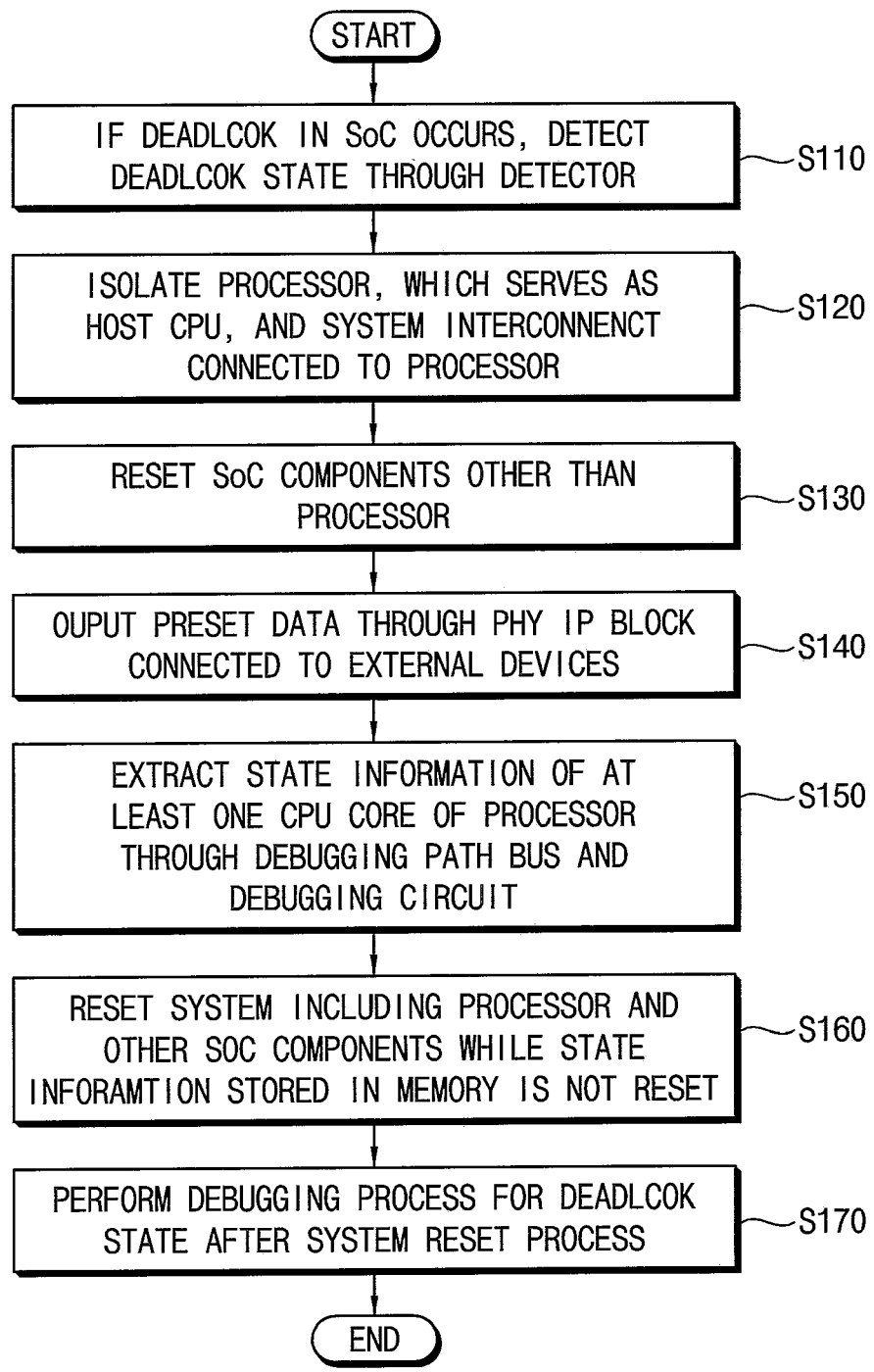
FIG. 13 is a flowchart of a process for operating an SoC according to some example embodiments.

FIG. 13 is a flowchart of a process for operating an SoC according to some example embodiments.

In FIGS. 7 to 12, the IP block 160 is not illustrated for convenience of explanation.

Hereinafter, an example process of operating an SoC will be described with reference to FIGS. 7 to 13.

Figure 7:
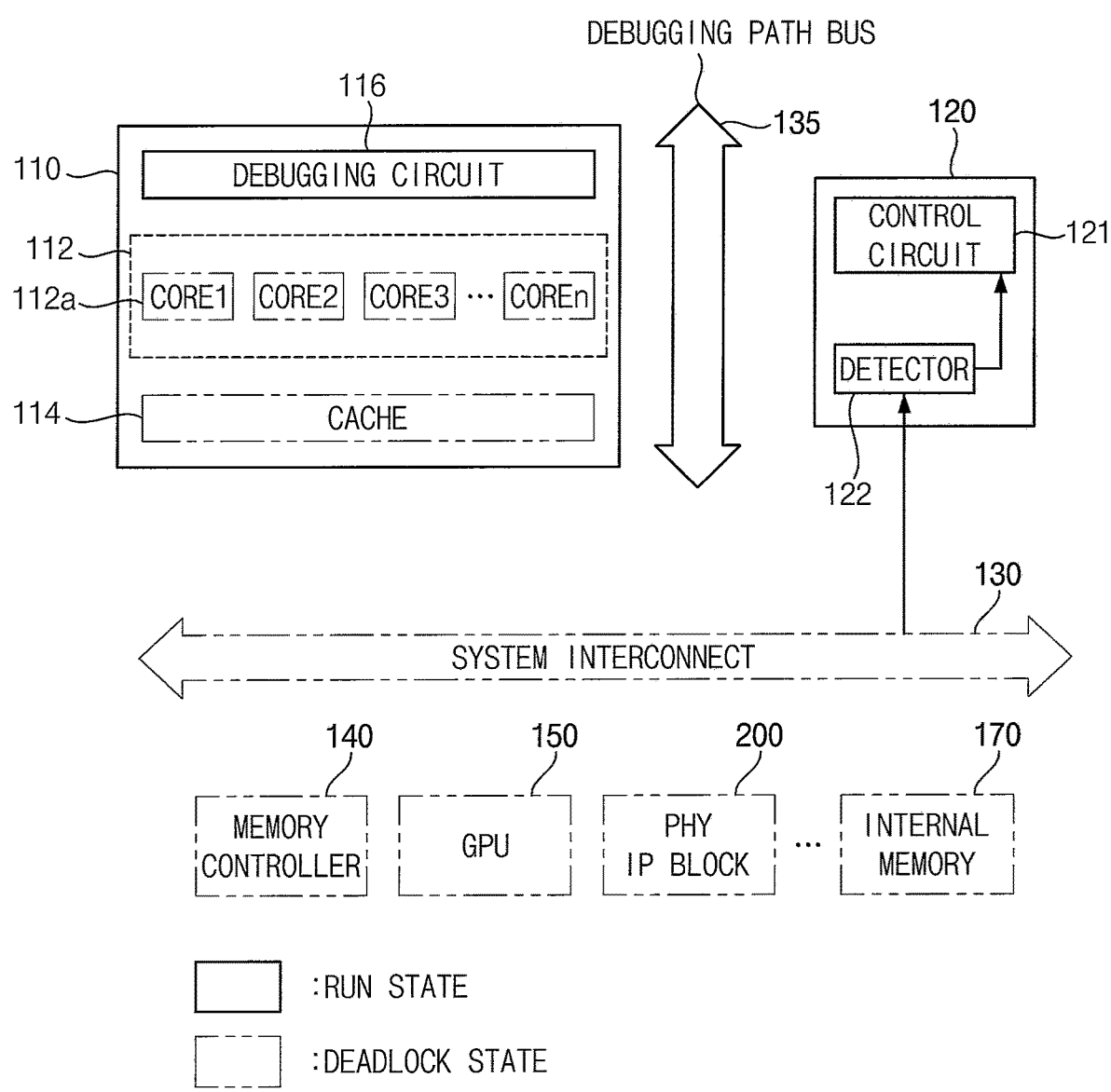
FIGS. 7 to 12 are block diagrams of a sequential operational flow of an SoC operation according to some example embodiments.

Referring to FIGS. 7 and 13, in operation S110, if a deadlock state in the SoC 100 occurs, the reset controller 120 may detect the deadlock state via the detector 122.

As long as the deadlock state does not affect debugging logic (e.g., the debugging circuit 116 and the debugging path bus 135 connected to the debugging circuit 116), the reset controller 120 may remain operational even when the processor 110 and other SoC components are in a deadlock state (see FIG. 7).

The detector 122 may include the watchdog timer 123 including a counter that can be periodically initialized by an initialization signal (a kick signal KCK). If the detector 122 does not receive the kick signal KCK for a certain period, the counter will not be initialized, and the counter will expire according to an expiration setting. If the counter expires, the detector 122 may send a time counter expiration signal to the control circuit 121. The time counter expiration signal may correspond to a signal that the SoC 100 is deadlocked.

Figure 8:
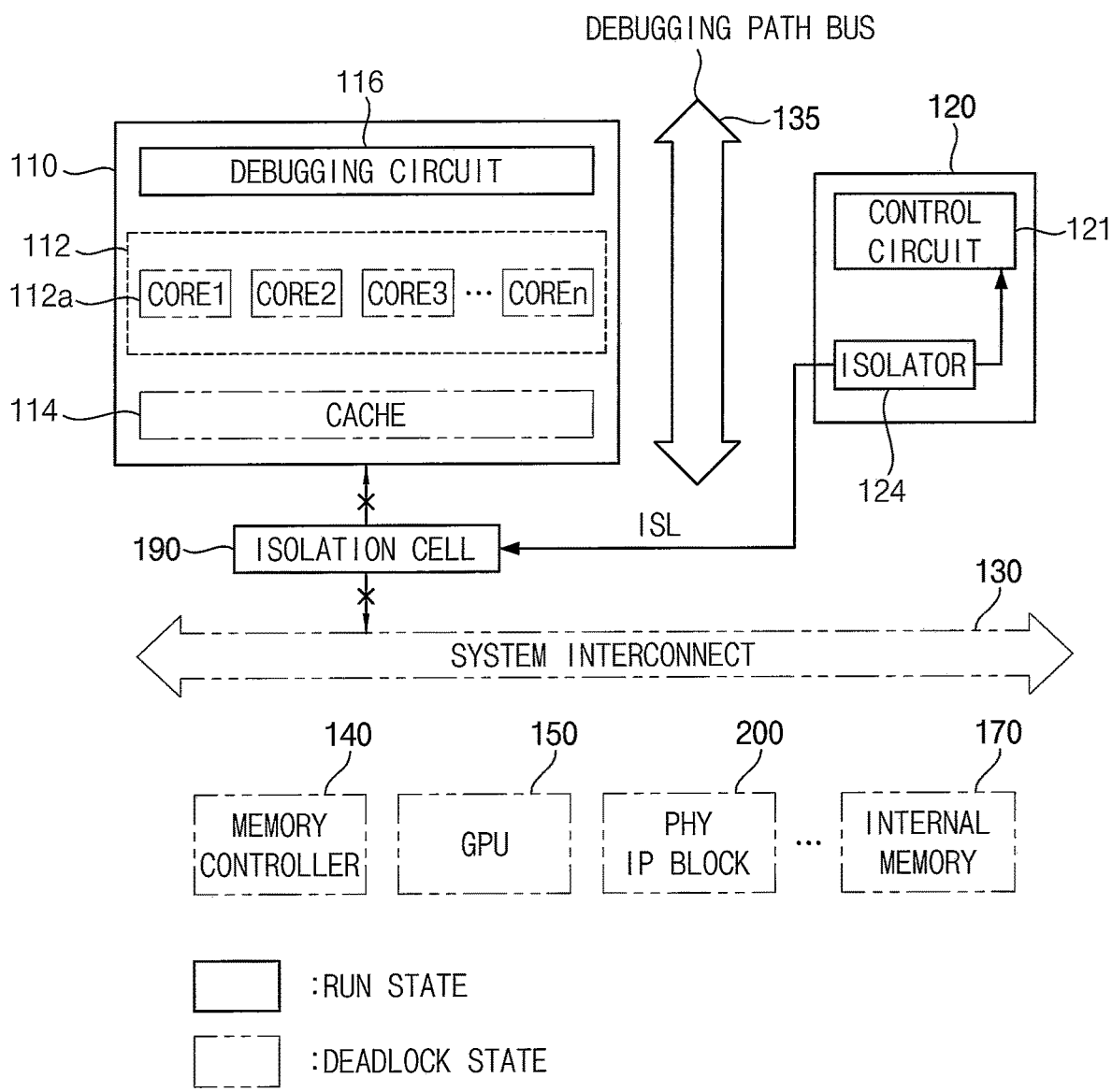

Once detecting the deadlock state of the SoC 100, in operation S120, the processor 110, which may serve as a CPU to operate an operating system, is isolated from the first bus 130, as shown in FIG. 8. For instance, in response to the signal for detecting a deadlock state of the SoC 100, the control circuit 121 of the reset controller 120 may trigger the isolator 124 to transmit the isolation signal ISL to the isolation cell 190 coupled between the processor 110 and the first bus 130 for isolating an interface signal of the processor 110 in a deadlock state.

The isolation process may include maintaining the state of the interface signal of the first bus 130 connected to the processor 110 or fixing the interface signal, such that the state of the transaction is not changed. Further, the isolation process may maintain the state of the processor 110 even though a reset sequence is applied on the first bus 130 for resetting the first bus 130 and other components of the SoC 100.

Figure 9:
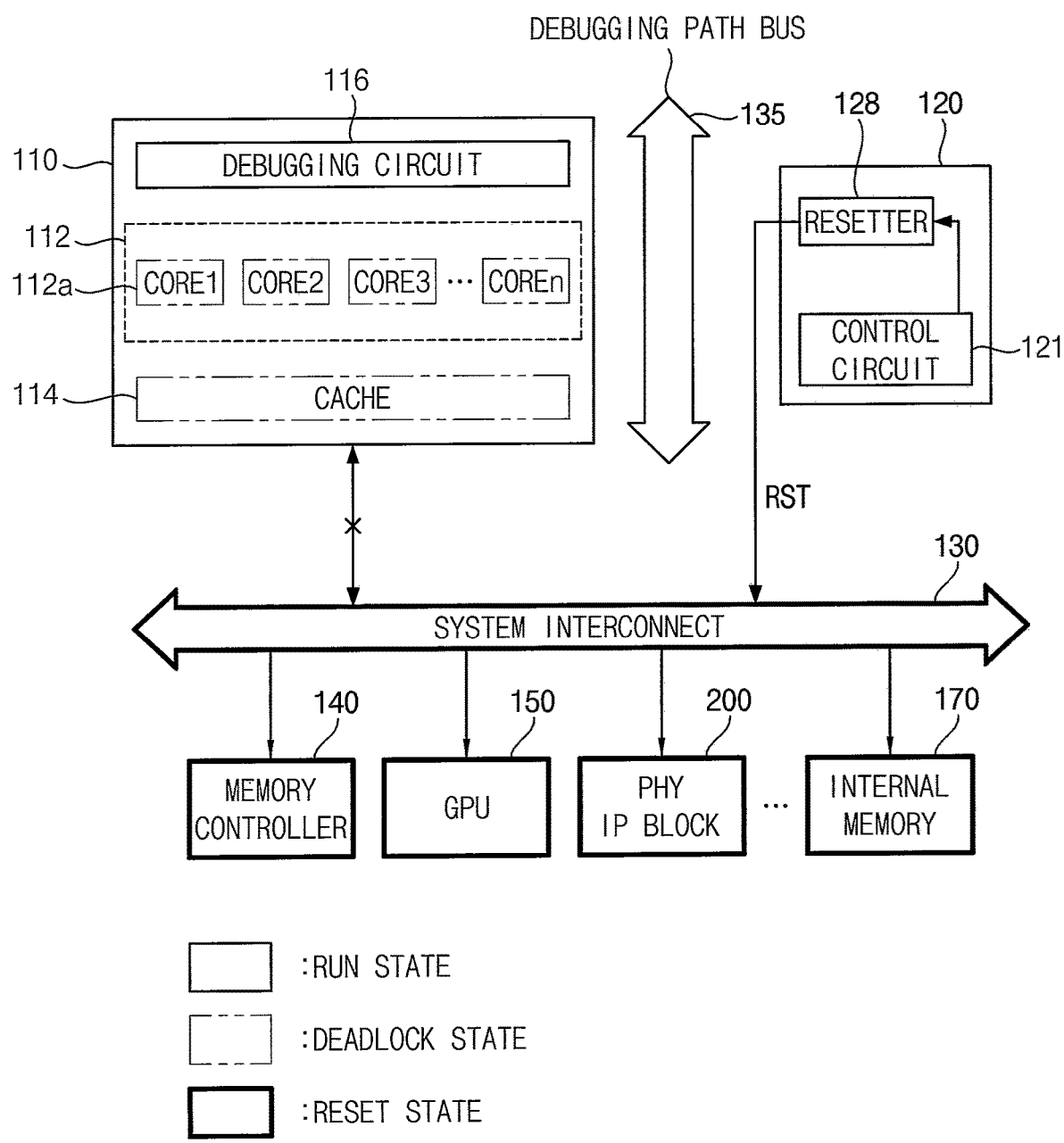

After isolating the processor 110 from the first bus 130, in operation S130, SoC components other than the processor 110 are reset as shown in FIGS. 9 and 13. Referring to FIG. 9, the control circuit 121 of the reset controller 120 may operate the resetter 126 to reset the SoC components other than the processor 110. Even when the processor 110 and a portion of SoC components are in a deadlock state, it may be difficult to identify which SoC component is in a deadlock state because the processor 110 is also in a deadlock state. Thus, if a deadlock state is detected, all SoC components (other than the processor 110) may be reset.

When the SoC components other than the processor 110 are reset, the PHY IP block 200 may output preset data to respective one of the external devices 300 in response to the reset signal RST in operation S140.

Figure 10:
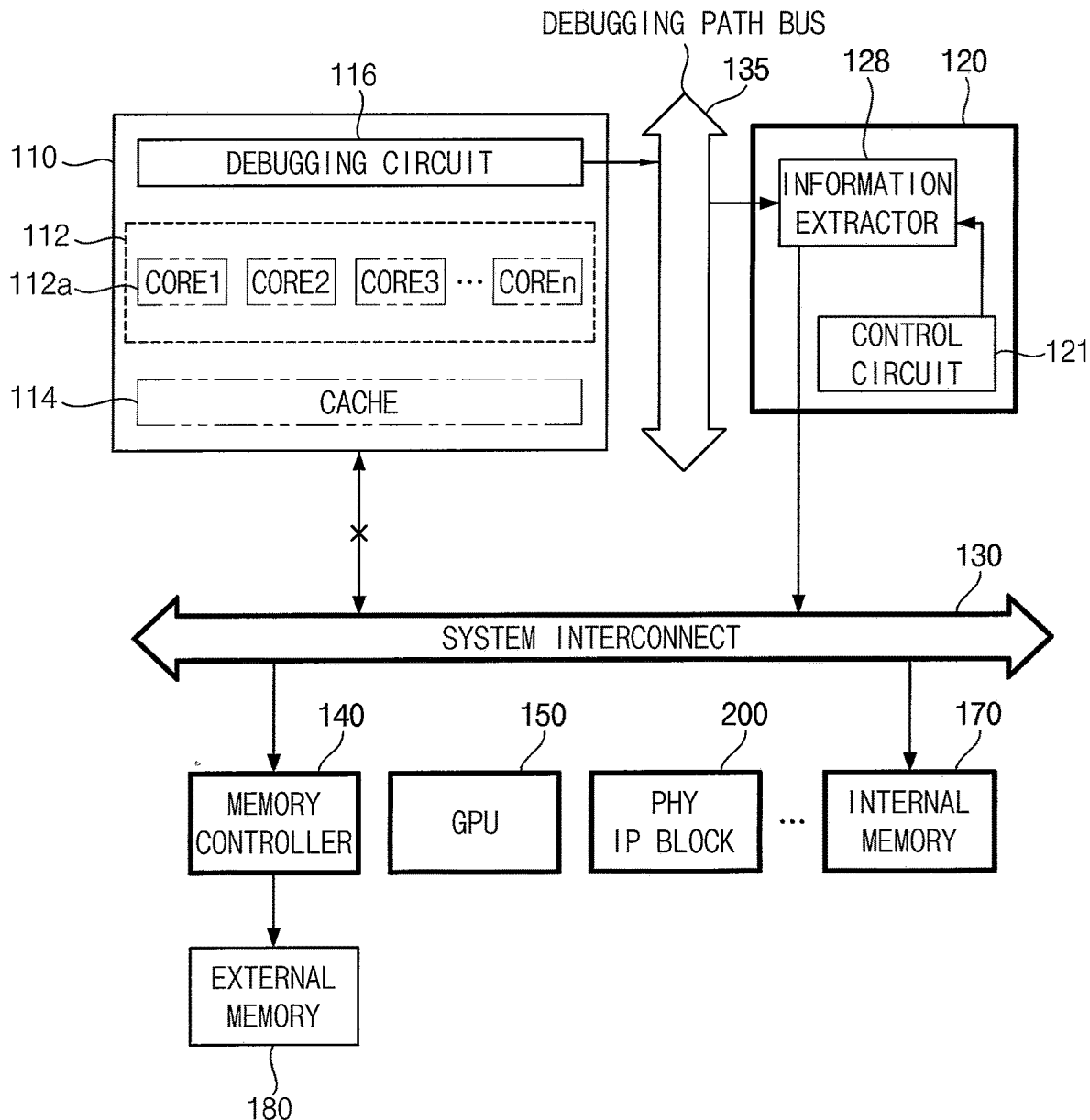

Referring to FIGS. 10 and 13, after the PHY IP block 200 outputs preset data to respective ones of the external devices 300 in response to the reset signal RST, the reset controller 120 may extract state information of at least one CPU core of the processor 110 via the debugging path bus 135 and the debugging circuit 116 in operation S150.

As shown in FIG. 10, the control circuit 121 of the deadlock controller 120 may operate the information extractor 128 to extract state information of one or more CPU cores in a deadlock state through the debugging circuit 116 in the processor 110 and the debugging path bus 135.

During the process of extracting the state information, the isolation between the processor 110 and the first bus 130 may be maintained, as shown in FIG. 10. The extracted state information of at least one CPU core may be data stored in registers of the CPU core.

Further, the extracted state information of at least one CPU core may be stored in a memory, e.g., the internal memory 170, which has been reset, in accordance with the control of the reset controller 120. As seen in FIG. 10, the extracted state information may be stored in the internal memory 170 or in the external memory 180 through the memory controller 140.

Figure 11:
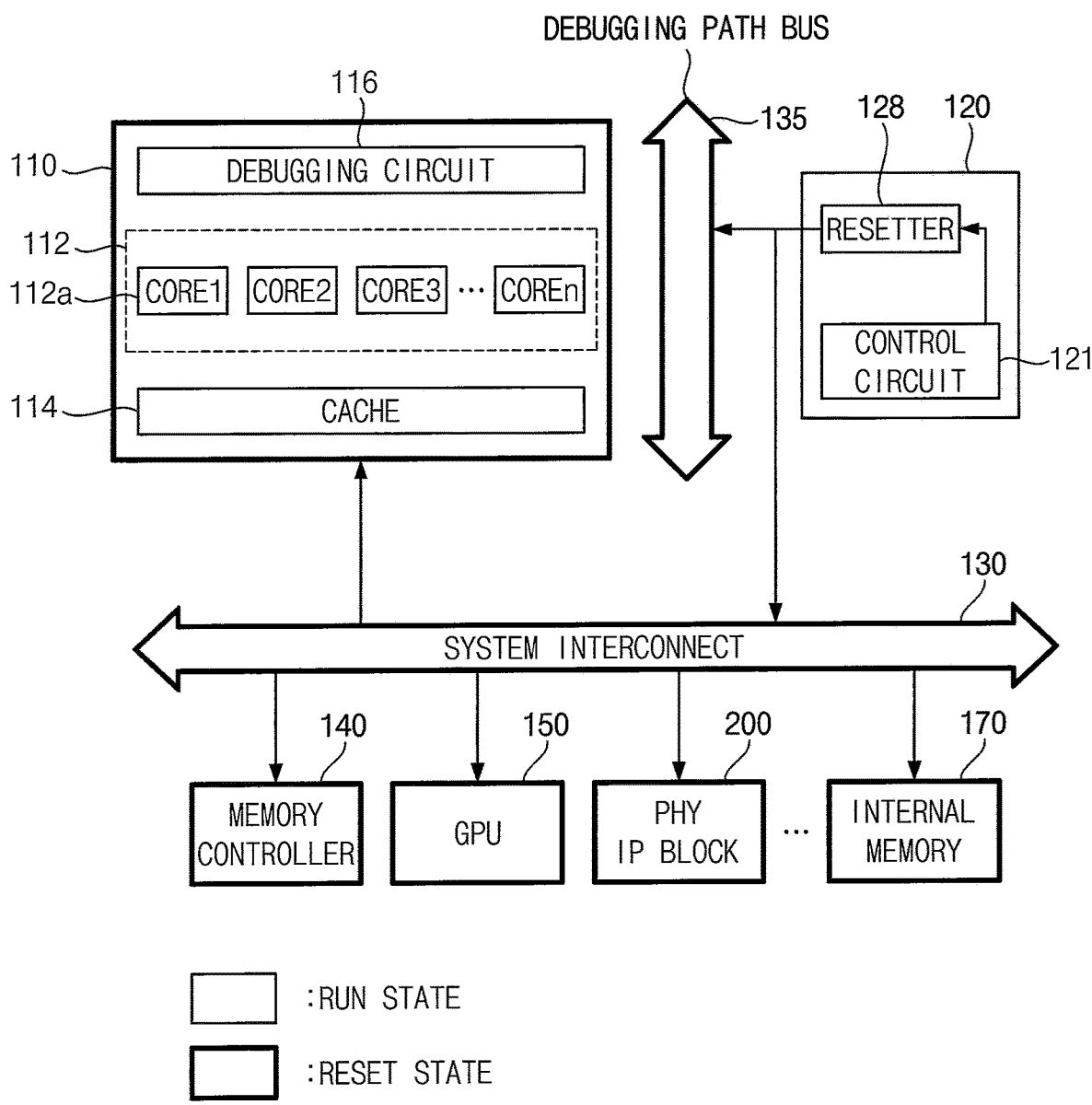

Referring to FIGS. 11 and 13, after extracting the state information of at least one CPU core of the processor 110 in the deadlock state and storing the extracted state information in a memory, all SoC component including the processor 110 may be reset in operation S160.

Figure 12:
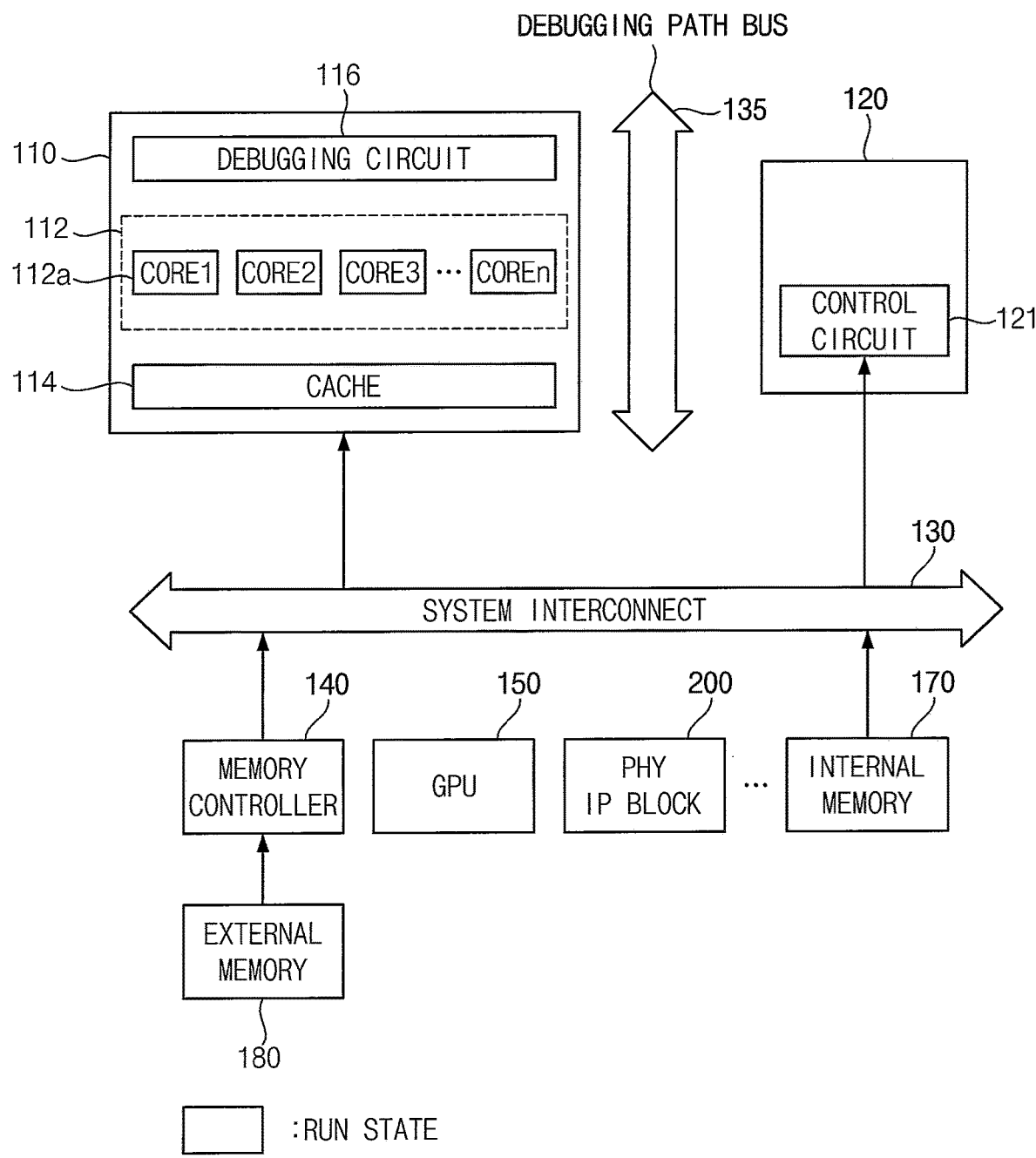

Referring to FIGS. 12 and 13, in operation S170, the reset controller 10 may perform a debugging process to debug the deadlock state after the system reset process of operation is performed. The control circuit 121 may retrieve the state information of at least one CPU core in a deadlock state, and store it in a memory, e.g., the internal memory 170 or the external memory 180 through the memory controller 140.

The debugging process may be performed by an external debugger that may be connected to the SoC 100 through, for instance, a joint test action group (JTAG) interface (not shown). However, according to one or more example embodiments, the reset controller 120 may enable a self-debugging process within the SoC 100. For instance, as shown in FIG. 12, the controller 121 of the deadlock control unit 120 may retrieve the state information stored in the memory, e.g., the internal memory 170, and perform a debugging process by analyzing the retrieved state information. The self-debugging process may be performed by a debugging unit other than the control circuit 121. For example, at least one CPU core of the processor 110 (after being reset) may perform the debugging after retrieving the state information from the memory, e.g., the internal memory 170.

An example of the self-debugging process performed in the SoC 100 will be now described in more detail. If the extracted state information of at least one CPU core is stored in a memory, which has been reset (see FIG. 10), the entire SoC may be reset (see FIG. 8), and the processor 110 may be rebooted (see FIG. 12). The rebooting of the processor 110 may not be a normal reboot, but a rebooting process for performing a software sequence to report the previous deadlock state information of the processor 110. For instance, the control circuit 121 of the reset controller 120 may analyze causes of the deadlock state based on the state information of the processor 110 stored in the memory 170 and a report from the processor 110. The control circuit 121 may further perform a debugging process to reconstruct the state of the deadlock of the processor 110.

Figure 14:
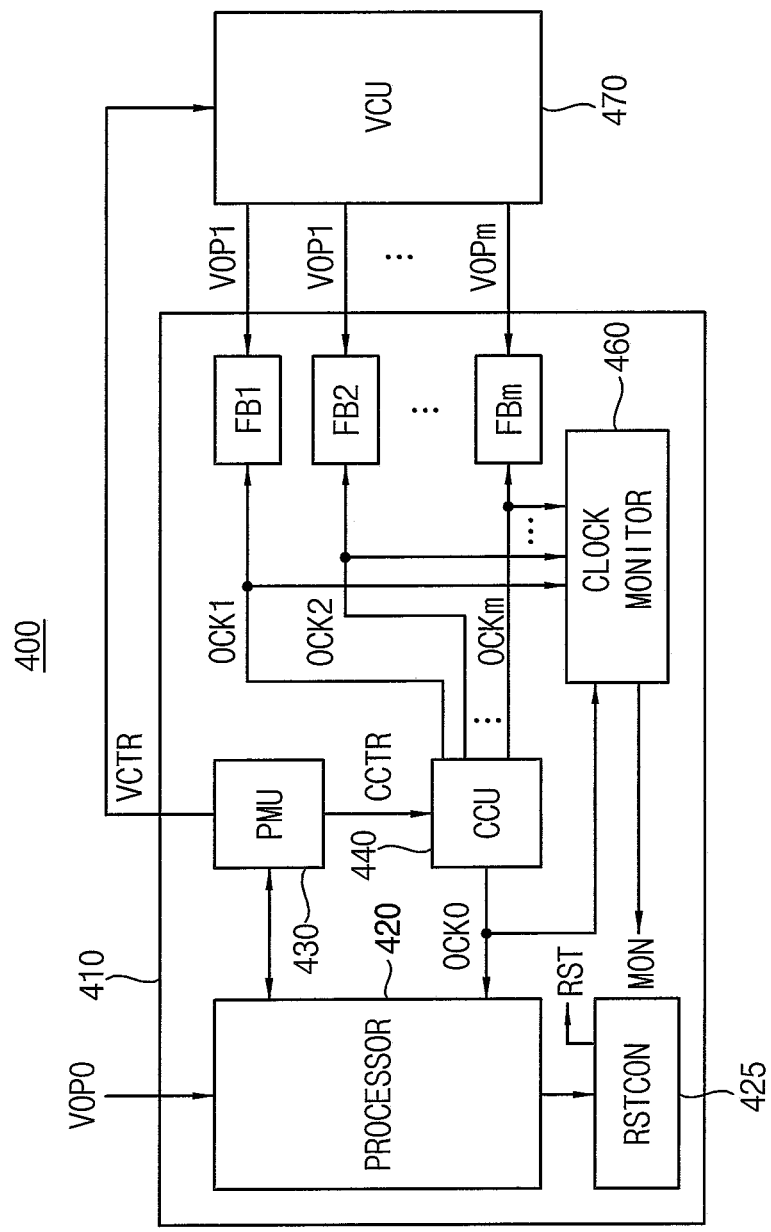
FIG. 14 is a block diagram illustrating a system according to some example embodiments.

FIG. 14 is a block diagram illustrating a system according to some example embodiments.

Referring to FIG. 14, a system 400 may include an integrated circuit 410, a voltage control unit (VCU) 470 (e.g., voltage controller or power controller) and a reset controller (RSRCON) 425.

The integrated circuit 410 may include at least one processor 420, a power management unit (PMN) 430 (e.g., power manager), a clock control unit (CCU) 440 (e.g., clock controller), one or more function blocks FB1~FBm and a clock monitor 460.

The integrated circuit 410 may be an SoC in which various hardware blocks are integrated as one chip or an application processor chip. The voltage control unit 470 may include at least one voltage regulator. The voltage control unit 470 may be referred to as a power supply or a power management integrated circuit (PMIC).

Even though one processor 420 is illustrated in FIG. 14 for convenience of illustration, the integrated circuit 410 may further include one or more processors or processing units.

The power management unit 430 may monitor the operating status or the operating condition of the integrated circuit 410 to determine an operating power level corresponding to the present operating condition. The power level may be changed by changing at least one of the operating voltage and the operating frequency.

The power management unit 430 may monitor the operating status or the operating condition such as the workload, the operating temperature, etc., of the integrated circuit 20 to determine the operating power level corresponding to the present operating condition.

The power management unit 430 may generate a voltage control signal VCTR and a clock control signal CCTR, and the voltage control unit 470 and the clock control unit 440 may provide the operating voltage and the operating frequency corresponding to the determined operating power level in response to the generated voltage control signal VCTR and the generated clock control signal CCTR, respectively.

For example, when the processor 420 and the function blocks FB1~FBm are included in different power domains, the operating voltages VOP0~VOPm provided to the processor 420 and the function blocks FB1~FBm may be controlled independently. In addition, when the processor 420 and the function blocks FB1~FBm are included in different clock domains, the operating clock signals OCK0~OCKm provided to the processor 420 and the function blocks FB1~FBm may be controlled independently.

The function blocks FB1~FBm may perform predetermined functions and each of the function blocks may be referred to an IP. For example, the function blocks FB1~FBm may include a memory controller, a CPU, a display controller, a file system block, a GPU, an image signal processor (ISP), a multi-format codec block (MFC), etc.

The reset controller 425 may employ the reset controller 120 in FIG. 2. The reset controller 425 may detect an abnormal state of the integrated circuit 410 in response to a signal from the processor 420 and may provide a reset signal RST to some of the function blocks FB1~FBm, which include physical layers.

The clock control unit 440 may generate the operating clock signals OCK0~OCKm that are provided to the processor 420 and the function blocks FB1~FBm, respectively. The clock monitor 460 monitors the frequencies of the operating clock signals OCK0~OCKm to generate a monitoring signal MON. The clock monitor 460 is described with reference to FIG. 15.

Figure 15:
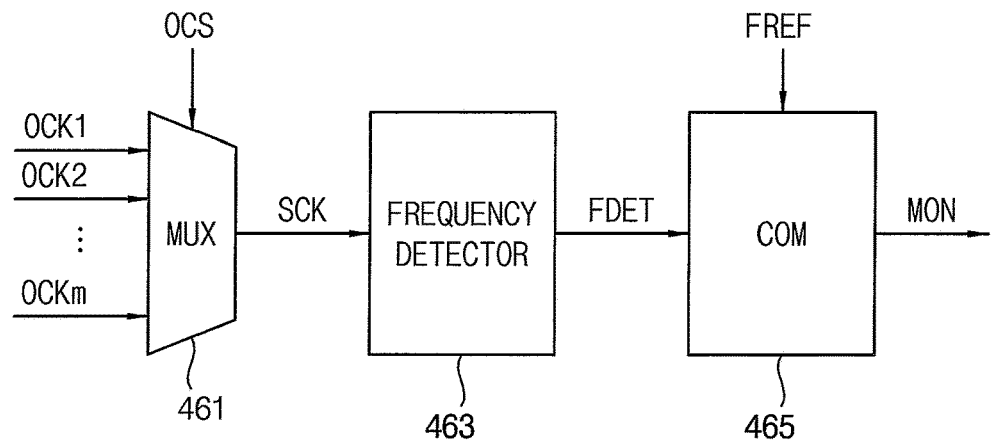
FIG. 15 is a block diagram illustrating a clock monitor included in the system of FIG. 14.

FIG. 15 is a block diagram illustrating a clock monitor included in the system of FIG. 14.

Referring to FIG. 15, the clock monitor 460 may include a selector MUX 461, a frequency detector 463 and a comparator (COM) 465.

The selector 461 may select one of a plurality of operating clock signals OCK0~OCKm, which are provided to the plurality of function blocks FB1~FBm in FIG. 14, respectively, to provide a selected clock signal SCK. The frequency detector 463 may detect a frequency of the selected clock signal SCK to provide a detection frequency FDET. The comparator 465 may compare the detection frequency FDET and a reference value FREF to generate a monitoring signal MON indicating abnormality of the operating clock signal corresponding to the selected clock signal SCK.

Figure 16:
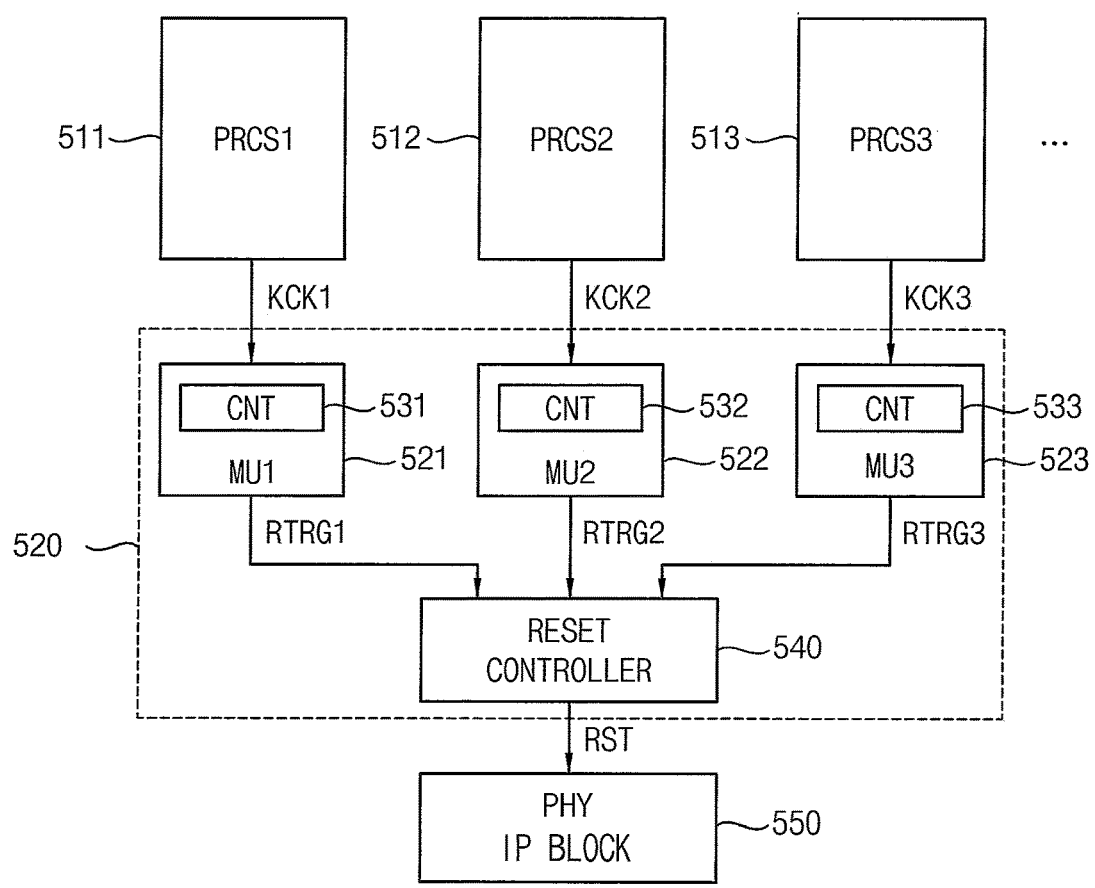
FIG. 16 is a block diagram illustrating an SoC according to some example embodiments.

FIG. 16 is a block diagram illustrating an SoC according to some example embodiments.

Referring to FIG. 16, an SoC 500 may include a plurality of processors (PRCS1) 511, (PRCS2) 512 and (PRCS3) 513, a deadlock detector 52 and a PHY IP block 550. FIG. 16 illustrates the three processors 511, 512 and 513 for convenience of illustration but the number of the processors included in the SoC 500 may be determined variously. The SoC 500 may include two processors or four or more processors.

The deadlock detector 520 may include a plurality of monitoring units (MU1) 521, (MU2) 522 and (MU3) 523 and a reset controller 540. Each of the monitoring units 521, 522 and 523 includes respective one of counters (CNT) 531, 532 and 533 and each of the counters (CNT) 531, 532 and 533 may be initialized in response to respective one of kick signals KCK1, KCK2 and KCK3 provided from respective one of the processors 511, 512 and 513.

Each of the monitoring units 521, 522 and 523 may monitor respective one of the processors 511, 512 and 513, may determine an abnormal state of the corresponding processor and may generate each of the reset trigger signals RTRG1, RTRG2 and RTRG3 indicating abnormal state of respective one of the processors 511, 512 and 513. The reset controller 540 activates reset signal RST in response to at least one of the reset trigger signals RTRG1, RTRG2 and RTRG3 being activated and may provide the activated reset signal RST to the PHY IP block 550.

In some example embodiments, the reset controller 540 may employ the reset controller 120 in FIG. 2 and the PHY IP block 550 may employ the PHY IP block 200 in FIG. 5A. Therefore, the reset controller 520 may detect an abnormal state of at least one of the processors 511, 512 and 513 an may provide a reset signal to the PHY IP block 550. The PHY IP block 550 may output a preset data to at least one external device connected to the PHY IP block 550.

Figure 17:
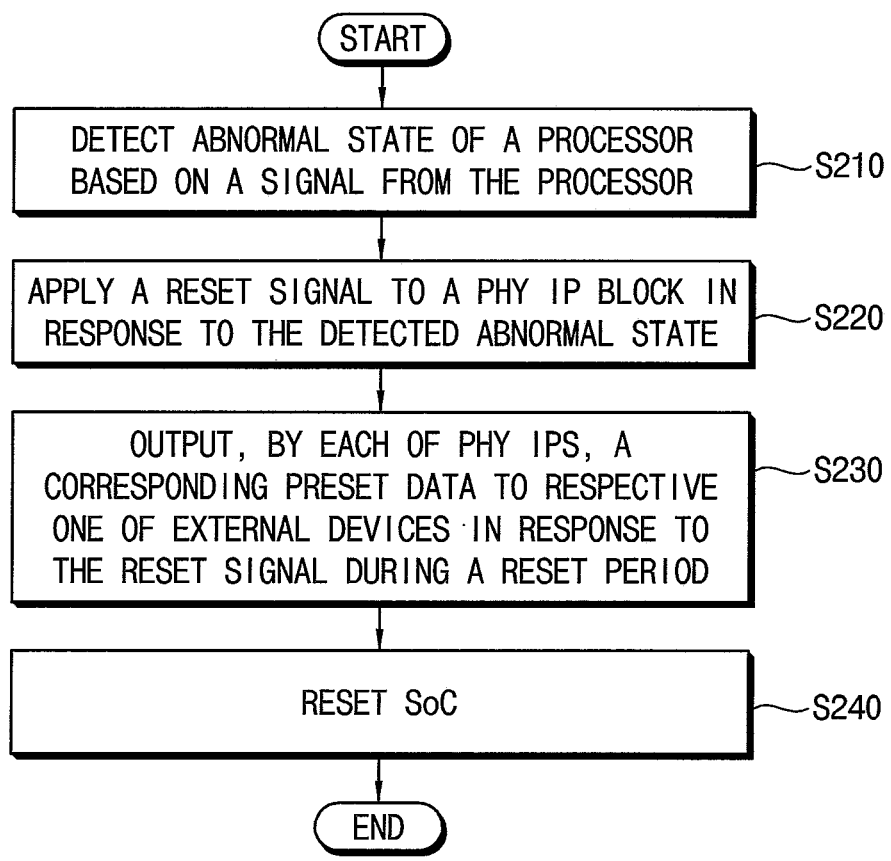
FIG. 17 is a flow chart illustrating a method of controlling a reset in an SoC according to some example embodiments.

FIG. 17 is a flow chart illustrating a method of controlling a reset of an SoC according to some example embodiments.

Referring to FIGS. 1 through 13 and 17, there is provided a method of controlling a reset of an SoC 100. The SoC 100 includes a processor 100 including a plurality of CPU cores, a system interconnect 130 connected to the processor 110, a PHY IP block 200 connected to the system interconnect 130, and including a plurality of PHY IPs including physical layers and connected to external devices 300 and a reset controller 120 connected to the system interconnect 130.

According to the method, the reset controller 120 detects abnormal state of the processor 110 based on a signal from the processor 110 in operation S210.

The reset controller 120 applies, a reset signal RST to the PHY IP block 200 in response to the detected abnormal state in operation S220.

Each of PHY IPs 210, 230 and 250 outputs a corresponding preset data to respective one of the external devices 300 in response to the reset signal RST during a reset period in operation S230. The SoC components are reset in operation S240.

Figure 18:
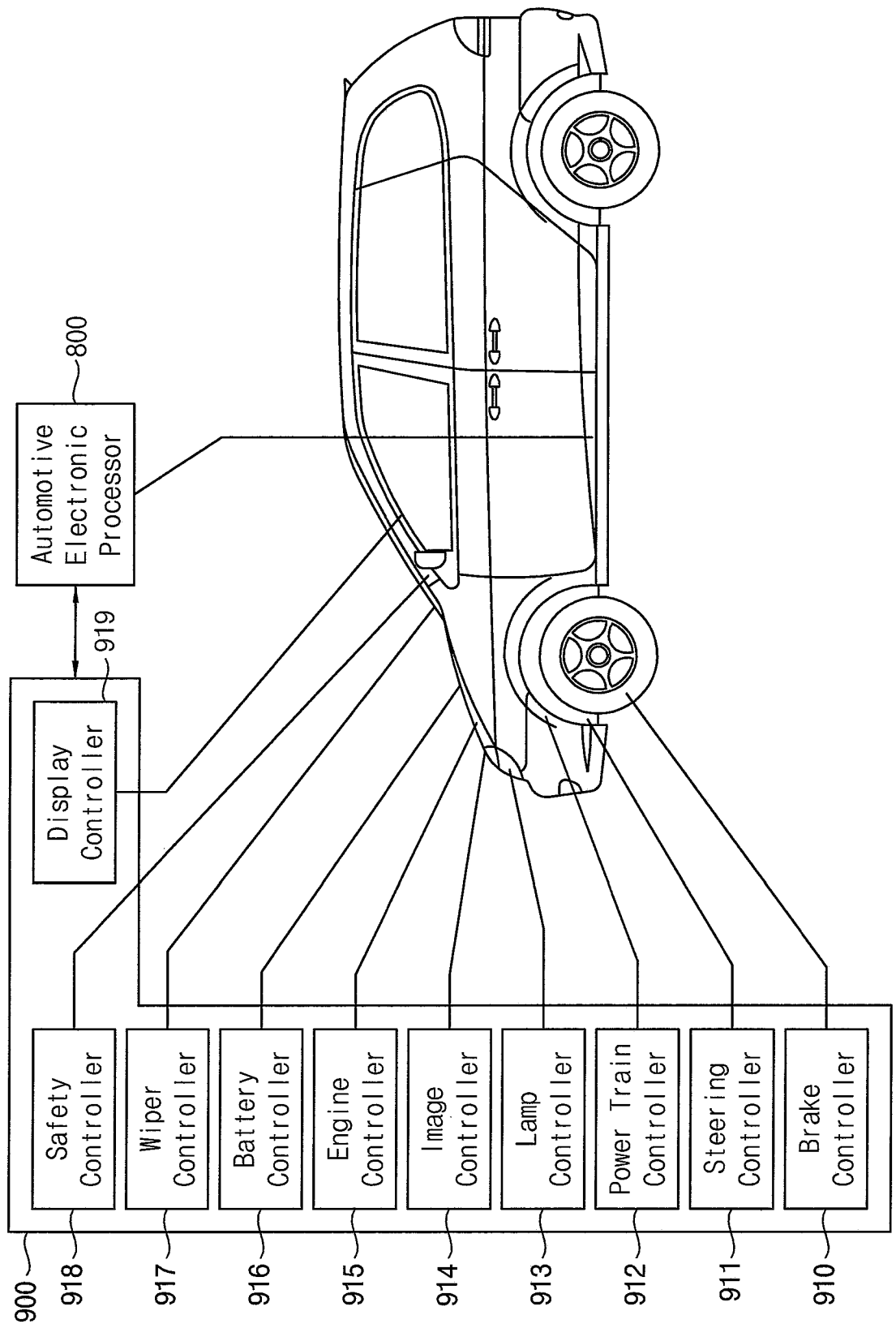
FIG. 18 is a diagram illustrating an automotive electronic processor and automotive electronic devices according to some example embodiments.

FIG. 18 is a diagram illustrating an automotive electronic processor and automotive electronic devices according to some example embodiments.

Referring to FIG. 18, an automotive electronic processor 800 may include the SoC 100 described with reference to FIG. 1 through 13. For example, the automotive electronic processor 800 may include a CPU core, a reset controller, a system interconnect and a PHY IP block.

The automotive electronic devices 900 may include a brake controller 910, a steering controller 911, a power train controller 912, a lamp controller 913, an image controller 914, an engine controller 915, a battery controller 916, a wiper controller 917, a safety controller 918, and a display controller 919. The brake controller 910, the steering controller 911, the power train controller 912, the lamp controller 913, the image controller 914, the engine controller 915, the battery controller 916, the wiper controller 917, the safety controller 918 and the display controller 919 may correspond to the PHY IP block 200.

Each of the brake controller 910, the steering controller 911, the power train controller 912, the lamp controller 913, the image controller 914, the engine controller 915, the battery controller 916, the wiper controller 917, the safety controller 918 and the display controller 919 may include the end point interface and may communicate with the automotive electronic processor 900 through the end point interface.

The brake controller 910 may include sensors that sense a state of a brake. The brake controller 910 may send sensing results of the sensors to the automotive electronic processor 800 through the end point interface. The brake controller 910 may further include a controller for controlling the brake. The brake controller 910 may receive a control command from the automotive electronic processor 800 through the end point interface. The brake controller 910 may control the brake depending on the control command.

The steering controller 911 may include sensors that sense a state of a steering. The steering controller 911 may send sensing results of the sensors to the automotive electronic processor 800 through the end point interface. The steering controller 911 may further include a controller for controlling the steering. The steering controller 911 may receive a control command from the automotive electronic processor 800 through the end point interface. The steering controller 911 may control the steering depending on the control command.

Likewise, the power train controller 912 may send sensing results of sensors associated with a power train to the automotive electronic processor 800. The power train controller 912 may control the power train depending on a control command from the automotive electronic processor 800.

The lamp controller 913 may send sensing results of sensors associated with lamps to the automotive electronic processor 800. The lamp controller 913 may control the lamps depending on a control command from the automotive electronic processor 800.

The image controller 914 may sense a scene, with a sensor, and encode, with an encoder, a scene within a field of vision to image data and may send the image data to the automotive electronic processor 800.

The engine controller 915 may send sensing results of sensors associated with an engine to the automotive electronic processor 800. The engine controller 915 may control the engine depending on a control command from the automotive electronic processor 800.

The battery controller 916 may send information about a state of a battery to the automotive electronic processor 800. The battery controller 916 may control settings of the battery depending on a control command from the automotive electronic processor 800.

The wiper controller 917 may send sensing results of sensors associated with an external environment (e.g., whether it rains) to the automotive electronic processor 800. The wiper controller 917 may control wipers depending on a control command from the automotive electronic processor 800.

The safety controller 918 may send, to the automotive electronic processor 800, sensing results of sensors associated with safety devices such as a seat belt, an airbag, and electronic controlled suspension (ECS). For another example, the safety controller 918 may send a sensing result associated with an external environment (e.g., inclination, fall, and collision) to the automotive electronic processor 800. The safety controller 918 may control the safety devices depending on a control command from the automotive electronic processor 800.

The display controller 919 may send sensing results of sensors associated with an external environment (e.g., intensity of illumination and a moving speed) to the automotive electronic processor 800. Depending on a control command from the automotive electronic processor 800, the display controller 919 may adjust the intensity of illumination of a display device or may limit content to be displayed.

The automotive electronic processor 800, in response to detecting an abnormal state, may control at least some of the automotive electronic devices 900 such that at least some of the automotive electronic devices 900 output preset data in response to a reset signal. Therefore, the automotive electronic processor 800 may prevent abnormal operation of a car including the automotive electronic processor 800 in emergency situation.

Figure 19:
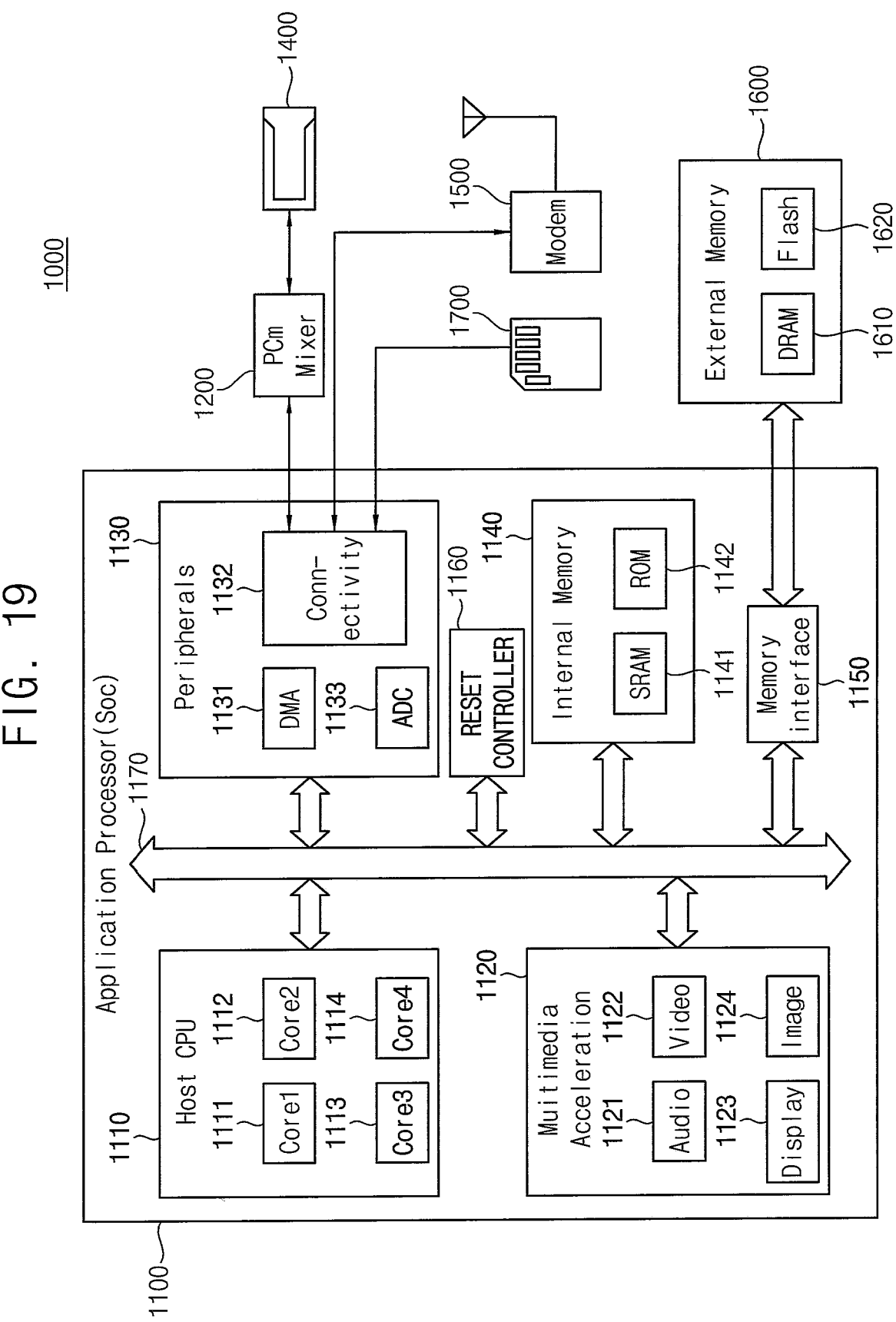
FIG. 19 is a block diagram illustrating a computing system according to some example embodiments.

FIG. 19 is a block diagram illustrating a computing system according to some example embodiments.

Referring to FIG. 19, a computing system 1000 may include an application processor (AP) 1100, a pulse code modulation (PCM) mixer 1200, an audio jack socket 1400, a modem 1500, an external memory 1600 and a memory card 1700.

The AP 1100 may be an SOC for activating an operation and applications for the computing system 1000, and control other components of the computing system 1000. As shown in FIG. 19, the AP 1100 may include a host CPU 1110, a multimedia acceleration block 1120, peripherals 1130, an internal memory 1140, a memory interface 1150 and a reset controller 1160. Components of the AP 1100 may be connected to a system bus 1170 to be capable of communicating with the system bus 1170. The system bus 1170 may be a multi-layered bus.

As shown in FIG. 19, the host CPU 1100 may include a plurality of cores 1111 to 1114, each of which may independently execute commands.

The multimedia acceleration block 1120 may include a plurality of logic blocks configured to process multimedia data. Each of the plurality of logic blocks included in the multimedia acceleration block 1120 may be configured to process multimedia data to increase efficiency of the AP 1100 and the computing system 1000. For instance, as shown in FIG. 19, the multimedia acceleration block 1120 may include an audio processing module 1121 (e.g., an audio processing circuit), a video processing module 1122 (e.g., a video processing circuit), a display driver module 1123 (e.g., a display driver circuit), and an image processing module 1124 (e.g., an image processing circuit).

The image processing module 1124 may decode source image data that is compressed by an image codec.

The peripherals 1130 may include a plurality of logic blocks configured to perform various functions, respectively. For example, as shown in FIG. 19, the peripherals 1130 may include a direct memory access (DMA) controller 1131 (e.g., a DMA controlling circuit), a connectivity module 1132 (e.g., a connectivity circuit), and an analog to digital converter (ADC) 1133.

The DMA controller 1131 may control a DMA operation performed by the system bus 1170. For example, without regard to the host CPU 1110, the DMA controller 1131 may control the audio processing module 1121 to access data stored in the internal memory 1140 or access data stored in the external memory 1600 through the memory interface 1150.

The connectivity module 1132 may include a plurality of logic blocks configured to support a communication standard for enabling the AP 1100 to communicate with other components of the computing system 1000 or an external device of the computing system 1000. For example, as shown in FIG. 19, the connectivity module 1132 may include a logic block configured to support a serial bus interface standard, such as integrated inter-chip sound (I2S). The connectivity module 1132 may transmit audio data generated by the audio processing module 1121 through I2S to the PCM mixer 1200 that is configured to receive the audio data and generate an audio signal.

The connectivity module 1132 may read source audio data stored in the memory card 1700 from the memory card 1700 and transmit the read source audio data to the audio processing module 1121, the internal memory 1140, or the external memory 1600.

The ADC 1133 may receive an analog signal and output digital data. For example, the ADC 1133 may be used to convert a user's input, which is received through a touch screen (not shown) included in the computing system 1000. The host CPU 1110 may interpret the user's input by referring to output data of the ADC 1133 of the peripherals 1130.

The internal memory 1140 may be a memory sub-system included in the AP 1100, and be connected to the system bus 1160 to be capable of communicating with the system bus 1170. As shown in FIG. 19, the internal memory 1140 may include SRAM 1141 and ROM 1142, and components of the AP 1100 may access the SRAM 1141 and the ROM 1142 through the system bus 1170.

The memory interface 1150 may provide an interface of the AP 1100 with the external memory 1600. For example, the external memory 1600 may include DRAM 1610 and flash 1620, and the memory interface 1150 may include a DRAM controller and a flash controller. Audio data, which is generated during an audio processing operation performed by the audio processing module 1121, may be stored in the DRAM 1610 of the external memory 1600 or the SRAM 1141 of the internal memory 1140.

In some example embodiments, the reset controller 1160 may employ the reset controller 120 in FIG. 2. Therefore, the reset controller 1160 may detect an abnormal state of the host CPU 1110 and provide a reset signal to the connectivity module 1132 in the peripherals 1130. The connectivity module 1132 may output a preset data to at least one external device connected to the connectivity module 1132 in a reset period in response to the reset signal.

Example embodiments may be employed in SoCs and systems including the SoCs and may increase debugging efficiency.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A system-on-chip (SoC), comprising:
a processor including a plurality of central processing unit (CPU) cores;
a first bus connected to the processor, the first bus being configured as a system interconnect;
a physical layer protocol (PHY) intellectual property (IP) block connected to the first bus, wherein the PHY IP block comprises a plurality of PHY IPs including physical layers and connected to external devices;
a second bus connected to the processor; and
a reset controller connected to the first bus and to the second bus, wherein the reset controller is configured to:
receive a first signal from the processor;
detect an abnormal state of the processor based on an absence of the first signal from the processor; and
apply a reset signal to the PHY IP block responsive to the detected abnormal state, and
wherein the PHY IP block is configured to output, during a reset period, preset data values to respective ones of the external devices in response to the reset signal.

2. The SoC of claim 1, wherein the reset controller includes a watchdog timer configured to detect the abnormal state in response to an expiration of the watchdog timer, and
wherein the expiration is configured to occur responsive to an abnormal operation of the processor.

3. The SoC of claim 2, wherein the processor is configured to periodically reset the watchdog timer with the first signal during a normal operation of the processor.

4. The SoC of claim 1, wherein the reset controller is configured to reset, after the PHY IP block outputs the preset data values to respective external devices, the PHY IP block and the processor.

5. The SoC of claim 1, wherein the PHY IP block includes:
a first PHY IP connected to the first bus, wherein the first PHY IP is configured to provide a first preset data to a first external device in response to the reset signal during the reset period;
a second PHY IP connected to the first bus, wherein the second PHY IP is configured to provide a second preset data to a second external device in response to the reset signal during the reset period; and
a third PHY IP connected to the first bus, wherein the third PHY IP is configured to provide a third preset data to a third external device in response to the reset signal during the reset period.

6. The SoC of claim 5, wherein:
the first PHY IP comprises a display controller;
the first external device corresponds to a display device; and
the first PHY IP is configured to output blue screen data to the display device as the first preset data in response to the reset signal during the reset period.

7. The SoC of claim 5, wherein:
the second PHY IP comprises a controller area network (CAN) communication module;
the second external device corresponds to an electronic control unit (ECU) in a car; and
the second PHY IP is configured to output a brake control command to the ECU as the second preset data in response to the reset signal during the reset period.

8. The SoC of claim 7, wherein the second PHY IP is configured to output the brake control command to the ECU after the second PHY IP outputs an ending frame of CAN protocol to the ECU during the reset period.

9. The SoC of claim 5, wherein the third PHY IP includes a peripheral component interconnect express (PCIe).

10. The SoC of claim 1, wherein the reset controller comprises:
a detector including a watchdog timer, wherein the detector is configured to detect the abnormal state in response to an expiration of the watchdog timer, wherein the expiration of the watchdog timer is configured to occur responsive to an abnormal operation of the processor;
an isolator configured to output an isolation signal in response to a detection of the abnormal state of the processor;
a resetter configured to output the reset signal in response to the expiration of the watchdog timer;
an information extractor configured to extract state information of the processor in response to the isolation signal; and
a control circuit configured to control the detector, the isolator, the resetter and the information extractor.

11. The SoC of claim 1, further comprising an isolation cell including a logic circuit configured to retain a signal value input to the processor in response to an isolation signal, wherein the reset controller is configured to isolate the processor in the abnormal state from the first bus by:
applying the isolation signal to the isolation cell; and
extracting, via the second bus, state information of the processor in the abnormal state.

12. The SoC of claim 11, wherein the logic circuit comprises one or more logic gates configured to:
receive a second signal from the first bus as a first input;
receive the isolation signal as a second input; and
output, based on the second signal and the isolation signal, a third signal to the processor.

13. The SoC of claim 11, further comprising:
a graphic processing unit (GPU) connected to the first bus; and
a memory controller connected to the first bus.

14. The SoC of claim 13, wherein the reset controller is configured to reset the GPU and the memory controller after isolation of the processor.

15. The SoC of claim 11, further comprising:
an internal memory connected to the first bus, wherein the reset controller is configured to store the extracted state information in the internal memory after a reset, the reset associated with the reset signal.

16. The SoC of claim 1, wherein the abnormal state includes at least one of a deadlock state of the processor and a hang-up state of the processor.

17. The SoC of claim 1, wherein the SoC corresponds to an automotive electronic processor installed in a car.

18. A method of controlling a reset of a system-on-chip (SoC), wherein the SoC includes a processor including a plurality of central processing unit (CPU) cores, a system interconnect connected to the processor, a physical layer protocol (PHY) intellectual property (IP) block connected to a first bus, and including a plurality of PHY IPs including physical layers and connected to external devices, a reset controller connected to the system interconnect, the method comprising:

receiving a first signal from the processor;

detecting, at the reset controller, an abnormal state of the processor based on absence of the first signal from the processor;

applying, by the reset controller, a reset signal to the PHY IP block in response to the detected abnormal state;

outputting, by each of the plurality of PHY IPs during a reset period, preset data values to respective ones of the external devices in response to the reset signal; and resetting the processor and the reset controller.

19. The method of claim 18, wherein:

one of the plurality of PHY IPs includes a controller area network (CAN) communication module;

one of the external devices corresponds to an electronic control unit (ECU) in a car; and the CAN communication module is configured to output a brake control command to the ECU as a first preset data value in response to the reset signal.

20. A system-on-chip (SoC), comprising:

a processor including a plurality of central processing unit (CPU) cores;

a first bus connected to the processor, the first bus being configured as a system interconnect;

a physical layer protocol (PHY) intellectual property (IP) block connected to the first bus, wherein the PHY IP block comprises a plurality of PHY IPs including physical layers and connected to external devices;

a second bus connected to the processor; and a reset controller connected to the first bus and to the second bus, wherein the reset controller is configured to:
 detect an abnormal state of the processor based on an absence of a first signal from the processor; and
 apply a reset signal to the PHY IP block responsive to the detected abnormal state, wherein the PHY IP block is configured to output, during a reset period, preset data values to respective ones of the external devices in response to the reset signal, and wherein the reset controller includes a watchdog timer configured to detect the abnormal state in response to an expiration of the watchdog timer, wherein the expiration is configured to occur responsive to an abnormal operation of the processor.

* * * * *